United States Patent
Tabata

(10) Patent No.: US 6,411,326 B1
(45) Date of Patent: Jun. 25, 2002

(54) STEREO IMAGE DISPLAY UNIT

(75) Inventor: Seiichiro Tabata, Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/082,303

(22) Filed: May 20, 1998

(30) Foreign Application Priority Data

May 21, 1997 (JP) .............................. 9-147300

(51) Int. Cl.[7] ......................... H04N 13/02; H04N 15/00; H04N 5/14; G09G 5/00

(52) U.S. Cl. ........................... 348/47; 348/51; 348/699; 345/9

(58) Field of Search ............................. 348/53, 54, 42, 348/43, 46, 51, 699, 47; 345/9

(56) References Cited

U.S. PATENT DOCUMENTS

| | | | | |
|---|---|---|---|---|
| 4,307,420 A | * | 12/1981 | Ninomiya et al. | 375/240.14 |
| 5,387,947 A | * | 2/1995 | Shin | 348/699 |
| 5,579,026 A | * | 11/1996 | Tabata | 345/8 |
| 5,644,324 A | * | 7/1997 | Maguire, Jr. | 345/9 |
| 5,682,171 A | * | 10/1997 | Yokoi | 345/7 |
| 5,692,061 A | * | 11/1997 | Sasada et al. | 382/106 |
| 5,717,415 A | * | 2/1998 | Iue et al. | 345/8 |
| 5,737,012 A | * | 4/1998 | Tabata et al. | 348/53 |
| 5,781,165 A | * | 7/1998 | Tabata | 345/8 |
| 5,801,760 A | * | 9/1998 | Uomori | 348/47 |
| 5,886,675 A | * | 3/1999 | Aye et al. | 345/7 |
| 5,917,460 A | * | 6/1999 | Kodama | 345/8 |
| 5,982,342 A | * | 11/1999 | Iwata et al. | 345/7 |
| 6,064,353 A | * | 5/2000 | Hoshi | 345/7 |
| 6,075,557 A | * | 6/2000 | Holliman et al. | 348/51 |
| 6,088,006 A | * | 7/2000 | Tabata | 345/7 |

* cited by examiner

Primary Examiner—Jeffery Brier
Assistant Examiner—Ryan Yang
(74) Attorney, Agent, or Firm—Pillsbury Winthrop LLP

(57) ABSTRACT

Input means (31,32,33) receives signals representing stereo image. Image change detection means (36) detects changes with time in stereo image represented by the signals received from the input means. High attention center presumable area determination means (37) determines a peculiar local area of a displayed image area to be an observer's high attention center presumable area according to a result of detection by the image change detection means. Depth detection means (38,39) obtains information representing the depth of the image in the particular local area specified by the high attention center presumable area determination means. Depth control means (40) controls a quantity concerning the depth of stereo image represented by the signals received form the input means according to the depth information received form the depth detection means. Output means (41,42) outputs signals representing stereo image, with the quantity concerning the depth having been controlled by the depth control means, as stereo image signals to be displayed on stereo image display means.

3 Claims, 34 Drawing Sheets

L-IMAGES (a) m-1(L)

(b) m(L)

(c) MOTION VECTOR

HIGH ATTENTION AREA (d)

STEREO IMAGE DISPLAY UNIT

BACKGROUND OF INVENTION

The present invention relates to stereo image display units for stereo image display according to a stereo image signal provided by input means after image depth control.

Various stereo observation displays for displaying image for stereo observation have been proposed.

In a prior art stereo observation display, the depth position of display surfaces and the merging depth position are not coincident. Therefore, a state of inconsistency between the mergence of the observer's eyeballs and the focus control may arise. When the inconsistency is increased, a human can no longer perceive a stereo image as a single image.

Several means for solving this problem have been proposed. Japanese Laid-Open Patent Publication No. 3-292093 discloses means for detecting an observer's attention center using a glance motion detector and varying the parallax by moving lens according to depth information at the attention center. This controls "depth position of display surfaces" such that the position coincides with merging depth position.

Japanese Laid-Open Patent Publication No. 7-167633 discloses means for detecting the observer's attention center by using a glance motion detector and controlling the parallax such that the depth at the attention center is reproduced on display surfaces of a stereo image display or at a position spaced apart from the surfaces by a specified distance. This controls "merging depth position" such that this position coincides with the depth position of the display surfaces.

The above two prior art techniques are the same insofar as the observer's attention center is detected and the depth position of stereo image is controlled on the basis of the depth information at the attention center. In these techniques, however, it is necessary to accurately detect the observer's attention center. This means that a glance motion detector having high accuracy of detection is necessary, thus leading to high price of the unit. In addition, the glance motion detector adds weight. Therefore, where a head mounted display (hereinafter abbreviated as HMD) is used as a stereo image display, the glance motion detector causes the weight increase of the HMD.

Japanese Laid-Open Patent Publication No. 6-225197 discloses a monitor, which can automatically recognize objects in a monitored zone and automatically trace an object to be noted. In this monitor, however, the object to be noted is not automatically recognized for the purpose of the depth control of stereo image.

SUMMARY OF THE INVENTION

An object of the present invention is to provide a stereo image display, which can determine an observer's high attention center point (or area) of an image without use of any special high detection accuracy glance motion detector and control the stereo image depth according to the depth information at the determined high attention center, thus providing a stereo image which is stable and can be very easily observed.

According to the present invention, there are provided the following featured stereo image display units;

Other objects and features will be clarified from the following description with reference to attached drawings.

PREFERRED EMBODIMENTS OF THE INVENTION

Preferred embodiments of the present invention will now be described will now be described with reference to the drawings.

In the first embodiment, a local image area with a motion vector different from that of the remainder of the display surface is detected, depth (distance) of the image in the detected image area is obtained, and glance distance and vergence distance in a stereo image observation are controlled to be coincident with each other. In this embodiment, a left and a right image with a parallax between them are collectively referred to as a stereo image.

Figure 1:
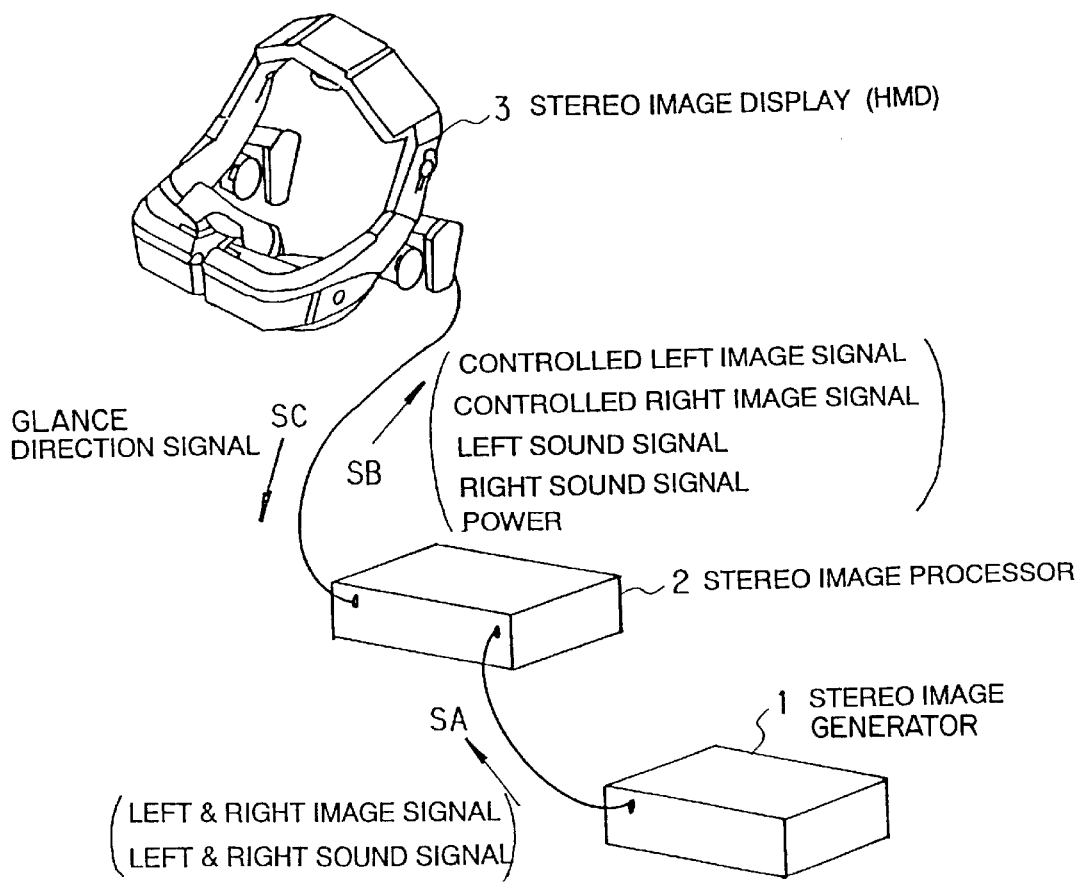
FIG. 1 is a view outlining the first embodiment of the stereo image display unit according to the present invention.

FIG. 1 is a view outlining the first embodiment of the stereo image display unit according to the present invention. The stereo image display unit illustrated in FIG. 1 comprises a stereo image generator 1, a stereo image processor 2 and a stereo image display 3. The stereo image generator 1 generates a stereo image signal SA (i.e., a left and a right image signals), and provides the signal together with a left and a right speech signal. The stereo image generator may be such an image generator as a video playback unit, a stereo image signal receiver, a stereo camera and so forth.

The stereo image processor 2 receives the stereo image signal SA from the stereo image generator 1, and executes predetermined image processing on this signal. The image processing includes an attention center determining process for determining the observer's attention center from changes in the received stereo image with time, a depth determining process of determining the depth of image present at the determined attention center, and a depth control process for controlling the depth of the stereo image. The stereo image SB having been depth controlled in the stereo image processor 2 is supplied together with power to the stereo image display 3.

The stereo image display 3 displays the received depth controlled stereo image. In this embodiment, a head mounted display (HMD) as shown in FIG. 1 is used. Inside the HMD 3 a left and a right display device and a left and a right eyepiece optical system, corresponding to the observer's left and right eyepiece optical systems, are assembled. The HMD 3 can transmit, if necessary, a glance direction signal SC to the stereo image processor 2.

Figure 2:
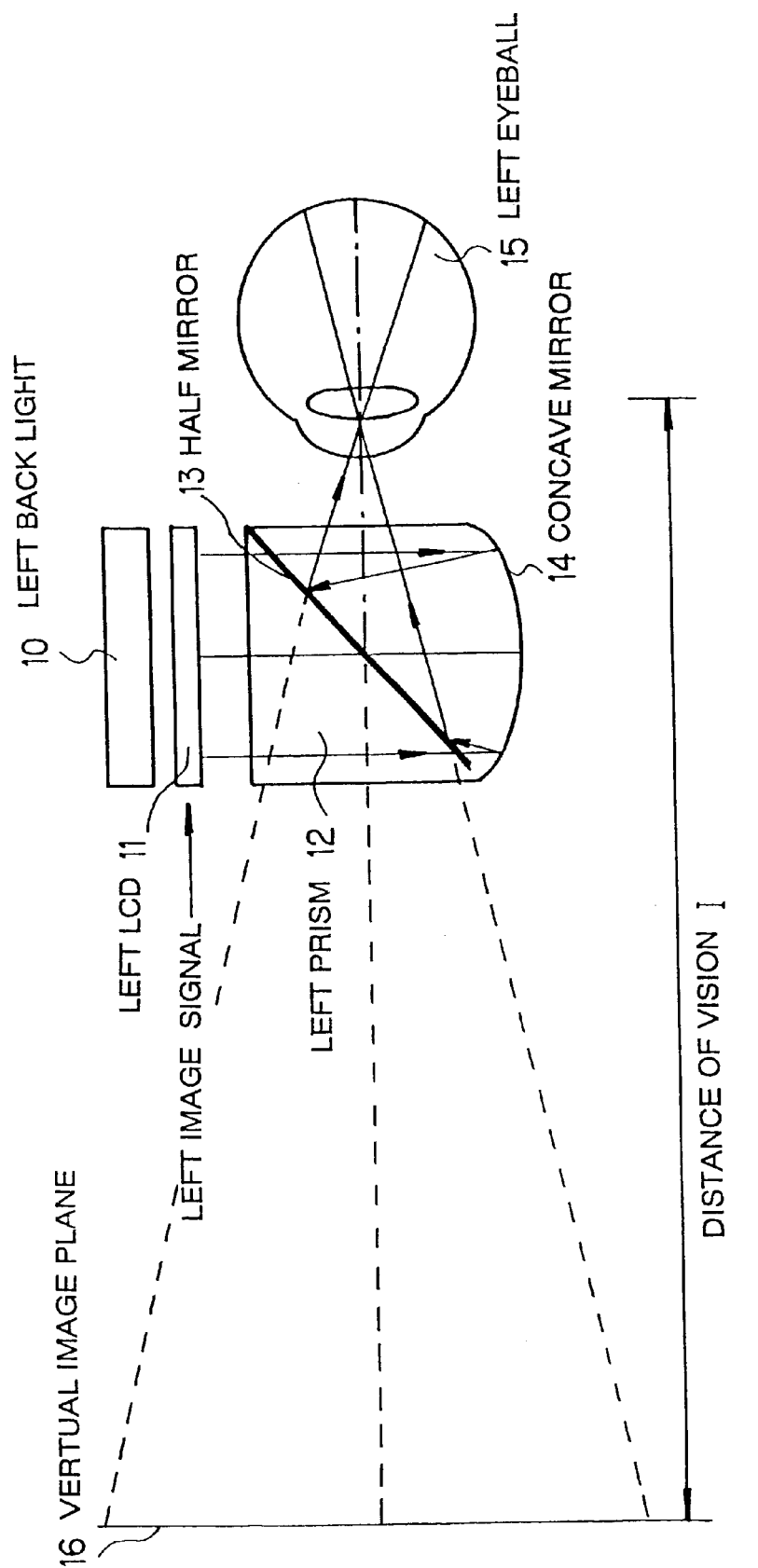
FIG. 2 is a view showing the construction of the optical system of the HMD 3 IN FIG. 1.

FIG. 2 is a view showing the construction of the optical system of the HMD 3. The optical system as shown in FIG. 2 is for one eyeball (i.e., left eyeball). The same optical system is also assembled for the other eyeball (i.e., right eyeball). When the left image signal SL of the left and right image signals have been depth controlled, they are supplied to a left LCD 11, a left image is displayed on the display surface of the left LCD 11. Designated at 10 is a back light. The displayed image is enlarged by an eyepiece optical system to be described later and led to the left eyeball 15.

The eyepiece optical system as shown in FIG. 2 is of prism type. Light from the display surface of the LCD 11 is incident on a prism 12 to be transmitted through a half mirror 13 and reflected by a concave mirror 14. The reflected light is reflected by the rear surface of the half mirror 13 and incident on the eyeball 15. The image on the display surface of the LCD 11 forms an enlarged virtual image plane 16, and the observer observes this virtual image plane 16. The distance I from the enlarged virtual image plane 16 to the eyeball 15 is determined by the distance from the eyepiece optical system to the display surface of the LCD 11. In this embodiment, the distance I from the enlarged virtual image plane 16 to the eyeball 15 is referred to as glance distance. The merging position of the stereo image is determined by the parallax of the left and right images. In this embodiment, the distance from the merging position of the stereo image to the principal plane of the eyepiece lenses is referred to as vergence distance.

While in this embodiment the HMD 3 is shown as the stereo image display, this is by no means limitative. For example, as the stereo image display may also be used displays (i.e., various TV units of shutter switching type, renticular type, etc.) described in "Fundaments of Three-Dimensional Images", supervised by Takeharu Izumi, edited by NHK Broadcast Technique Research Institute, issued by Ohm Co., Ltd., 1995, pp. 130–178).

In these stereo TV units, the glance distance is the distance from the display surface of a CRT or the like to the observer's eyeballs, and the vergence distance is the distance from the merging position to the observer's eyeballs.

Figure 3:
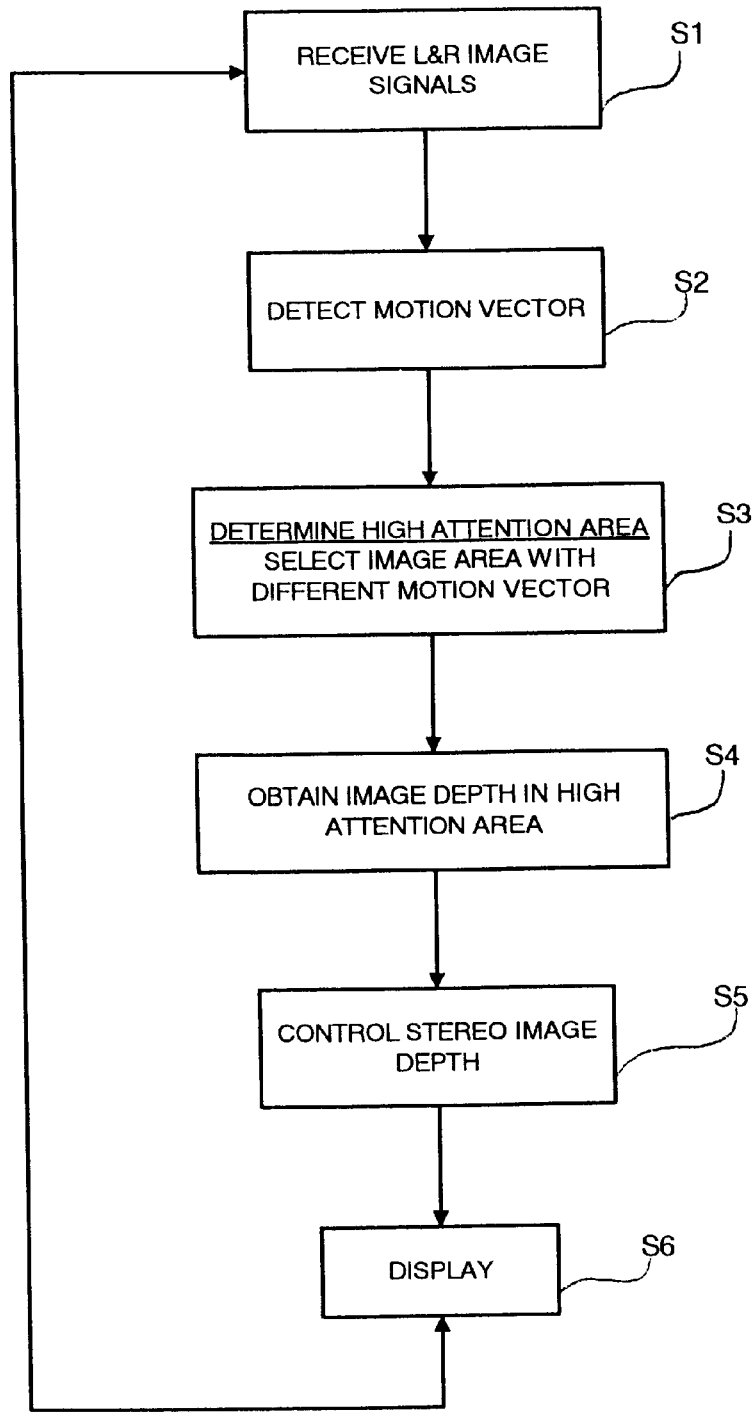
FIG. 3 is a flow chart illustrating the operation of the first embodiment.

FIG. 3 is a flow chart illustrating the operation of the embodiment. The flow chart illustrates a routine that a left and a right image provided from the stereo image generator 1 are processed in the stereo image processor 2 and displayed on the HMD 3. The operation of this embodiment will now be described reference to FIGS. 4(a) to 4(i) and following Figures.

(Step S1)

The left and right image signals provided as stereo image signal SA from the stereo image generator 1 are successively received by the stereo image processor 2. Now it is assumed that the processor 2 receives left and right image frames m–1(L) and m–1(R) as shown in FIGS. 4(a) and 4(b) and then a left and a right image frames m(L) and m(R) as shown in FIGS. 4(c) and 4(d).

These images are obtained by stereo photography performed by following a car running to the right in the display surfaces. Thus, the position of the car image in FIG. 4(c) has not been changed from that in FIG. 4(a). The position of the background image, on the other hand, has been changed to the left. The same progress has taken place between FIGS. 4(b) and 4(d).

Figure 4:
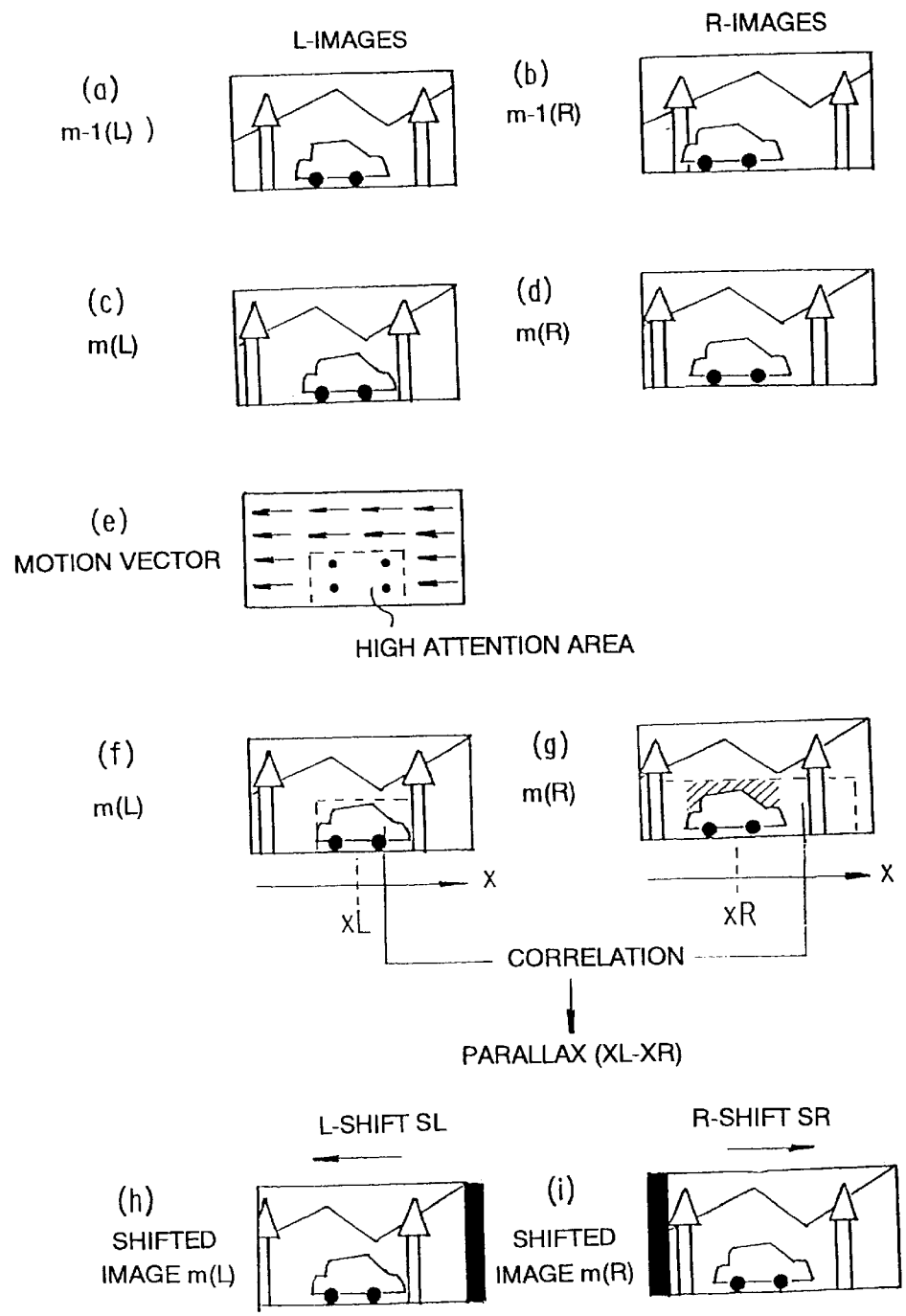
FIGS. 4(a)–(i), FIGS. 5(a), (c) and (e), FIGS. 6(a), (c) and (e), FIGS. 7(a), (c) and (e) and FIGS. 8(a), (c) and (e) are exemplified processed images according to the first embodiment.

The image of the car which is virtually closer to the camera, is at a position deviated to the left in FIG. 4(b) compared to the position in FIG. 4(a). That is, a parallax is present between these positions. The background, on the other hand, is virtually at infinitely remote position, and its image positions in FIGS. 4(a) and 4(b) coincide with each other. That is, the parallax between these positions is zero. The same thing applies to FIGS. 4(c) and 4(d).

(Step S2)

Motion vectors between adjacent time instants are detected. In this case, either left or right image frames are used. In the case of using left image frames, motion vectors of the image in FIG. 4(a) with respect to the image in FIG. 4(c) are detected. In a method of motion vector detection, each image frame is divided into a plurality of blocks of a small area, and template matching is made for each block. As a result of this process, motion vectors as shown in FIG. 4(e) are obtained.

FIG. 4(e) shows that in an area in which the car image is found the motion vector is zero, that is, no motion has occurred, and in the area in which the other images are found a leftward motion vector is obtained, indicating that the images are proceeding to the left.

(Step S3)

An image area which the observer's attention is centered on (referred to as high attention center presumable area) is determined.

Specifically, a local image area with a different motion vector from that of the remainder of the display surface is selected. In the case of FIG. 4(e), the area shown enclosed by the dashed line rectangle is such that its motion vector is different from that of the remainder of the display surface. This area is thus determined to be a high attention center presumable area.

Figure 5:
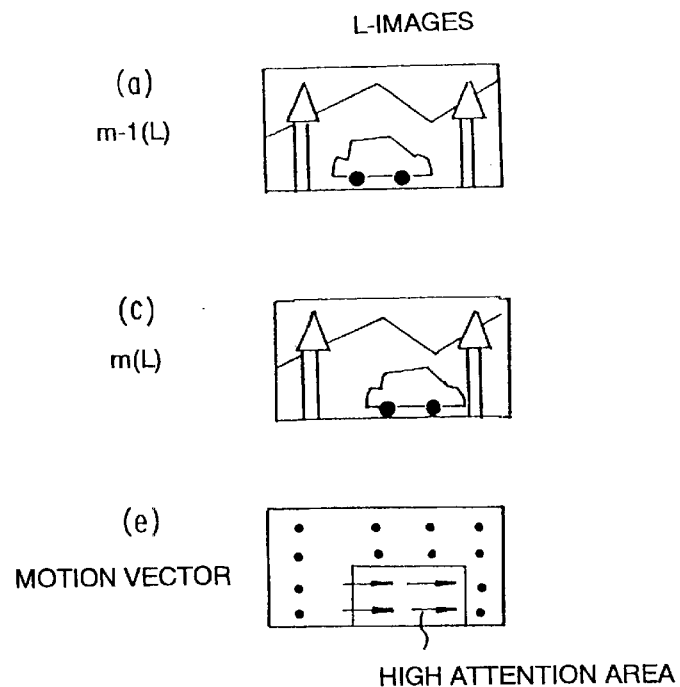

FIG. 5(e) shows a case converse to the case of FIG. 4(e). In this case, a motion vector is involved only in a local image area of the display surface, and the remainder thereof involves zero motion vector. In this case, area with the motion vector is determined to be a high attention center presumable area.

Figure 6:
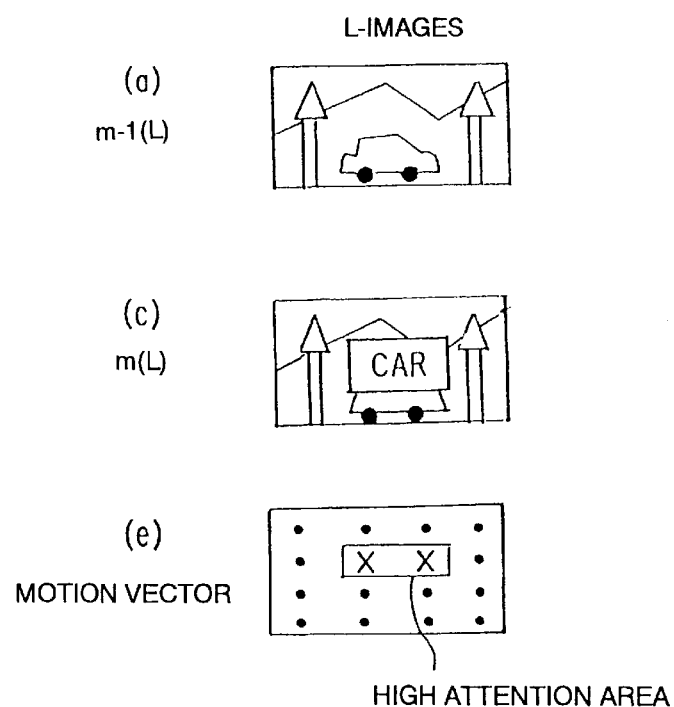

FIGS. 6(a), 6(c) and 6(e) illustrate a case of a change in a local image in the display surface. In this case, the image change area alone provides an abnormal value such that no motion vector is obtainable. In this case, the area providing the abnormal value is determined to be a high attention center presumable area.

In all the above examples, only a single local image area is present, which involves a different motion vector from that of the remainder of the display surface, and the area with the different motion vector is selected to be a high attention center presumable area.

Figure 7:
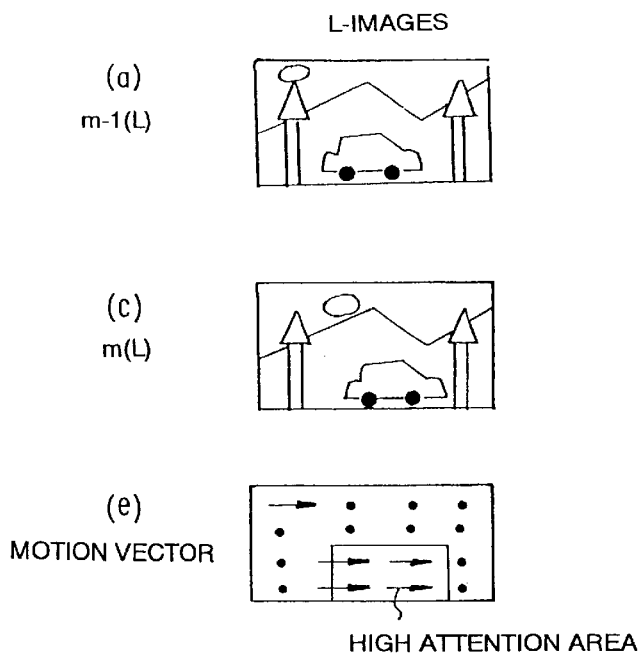

FIGS. 7(a), 7(c) and 7(e) illustrate a case in which a plurality of (i.e., two in this case) local image areas involving different local vectors from that of the remainder of the display surface are present. In this case, the closest different motion vector area to the center of the display surface is selected to be a high attention center presumable area. In the case of no substantial image change, a central display surface area having a predetermined size is made to be a high attention center presumable area.

Figure 8:
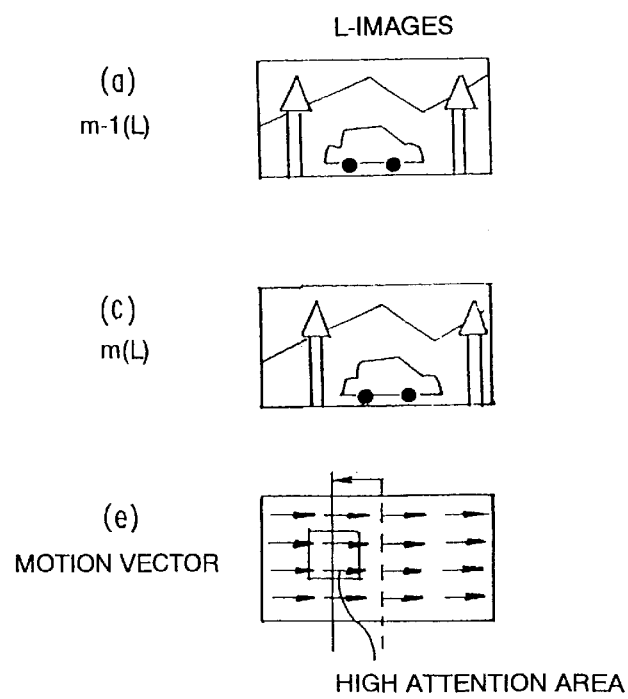

FIGS. 8(a), 8(c) and 8(e) illustrate a case in which the whole display surface image proceeds uniformly from one side to the other just like a scene seen through a car window. In this case, all the motion vectors involved have the same vector value. In such a case, an area shifted from the display surface center by a predetermined width in the direction opposite to the direction of the motion vectors is made to be a presumed attention center area. This is made so because the observer tends to fix the attention center to the upstream side of motion (i.e., left side in the Figures from which new images appear). For this reason, it is appropriate to make "the area shifted by a predetermined width in the direction opposite to the direction of the motion vectors" as above to be a presumed attention center area.

Figure 9:
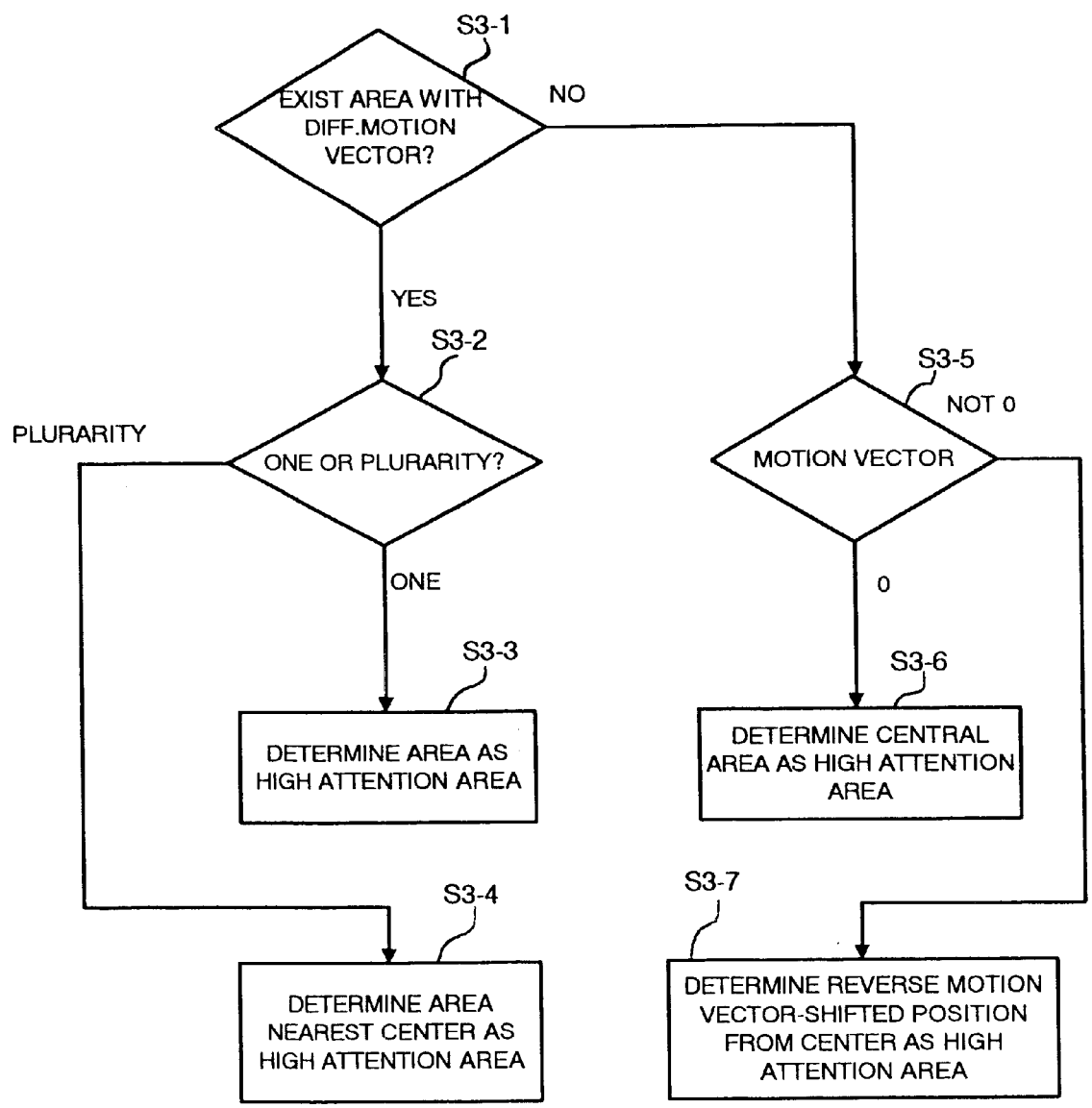
FIG. 9 is a routine of the high attention center presumable area determination in the first embodiment.

FIG. 9 illustrates the routine of the "high attention center presumable area determination" in the step S3 described above.

(Step S4)

The depth of the image in the high attention center presumable area is obtained. The depth may be obtained by a number of methods, three typical methods are as follows.

(1) Correlation method: In the high attention center presumable area, the parallax between the left and right image frames are derived by making a correlation calculation.

(2) Distance signal addition method: A signal representing the depth is preliminarily added for each image area. By selecting a high attention center presumable area, a depth signal corresponding to that area is specified.

(3) Distance detection method: The depth of an object found in the direction of a high attention center presumable area is detected. For the detection, a distance sensor provided in a stereo camera or a computer graphics Z buffer value is used.

Here, the case of obtaining the depth by the correlation method in (1) will be described by referring to FIGS. 4(a) to 4(i) again. As shown in FIG. 4(f), the high attention center presumable area in the left image in frame m(L) has already been determined by the step S3. Now, an area in right image frame m(R) that corresponds to the dashed rectangle area in the left image frame m(L), will be obtained by correlation calculation. As an example of the correlation calculation, the dashed line rectangle area in FIG. 4(f) a template matched with the dashed line rectangle area in the frame m(R) as shown in FIG. 4(g). The dashed line rectangle area in FIG. 4(g) is an enlargement to the left and right of the dashed line rectangle area in FIG. 4(f) as center area.

As a result of the correlation calculation, the corresponding area can be determined from a correlation shift curve having a certain correlation peak as shown in, for instance, FIG. 10(a). As a result, it is seen that the shaded area in FIG. 4(g) corresponds to the image enclosed in the dashed line rectangle in FIG. 4(f). Now, the difference (xL−xR) between x coordinate xL of the center position in the dashed line rectangle area in FIG. 4(f) and x coordinate xR of the center position in the dashed line rectangle area in FIG. 4(g) is obtained. The x coordinate represents the position of image in the horizontal direction. The difference (xL−XR) is the so-called parallax, and represent the depth direction. In the case of FIG. 10(a), the correlation shift corresponding to the correlation peak directly represents the parallax (xL−xR).

The image as shown in FIG. 4(f) may contain a plurality of local images having different depths. In such a case, a plurality of different parallaxes are obtained as a result of correlation calculation. In this case, the final parallax is determined in the following ways.

(1) The greatest parallax is selected to be the final parallax. That is, the nearest parallax is selected. In the case of a correlation shift curve having two correlation peaks (as shown in FIG. 10(b)), the greater correlation shift is selected.

(2) The mean value of a plurality of parallaxes is made to be the final parallax. As shown in FIG. 10(c), the mean value of correlation shifts corresponding to two correlation peaks is selected.

(3) The parallax corresponding to the maximum peak is selected to be the final parallax. With a low contrast image area, the correlation peak between the left and right images is low. On the other hand, with a high contrast image area or an area where data are collected, the correlation peak is high. Thus, the latter area is selected to the observer's high attention center presumable area, and the parallax of the higher correlation peak image area is selected to be the final parallax. as shown in FIG. 10(d), the correlation shift corresponding to the higher correlation peak is selected to be the parallax.

(Step S5)

The stereo image is depth controlled according to a depth control signal such that the glance distance and the vergence distance coincide with each other. The depth control is made by methods which are roughly classified into the following two types.

(1) Vergence distance control: The vergence distance is controlled to the desired one (i.e., glance distance) by horizontally shifting the left and right images.

(2) Glance distance control: The glance distance is controlled such that it coincides with the depth (for instance in the control of the distance between the display device and the lens in the eyepiece optical system of the HMD 3).

Here, the vergence distance control in (1) will be described. First, the relation between the parallax and the vergence distance L in stereo image observation will be described.

Figure 11:
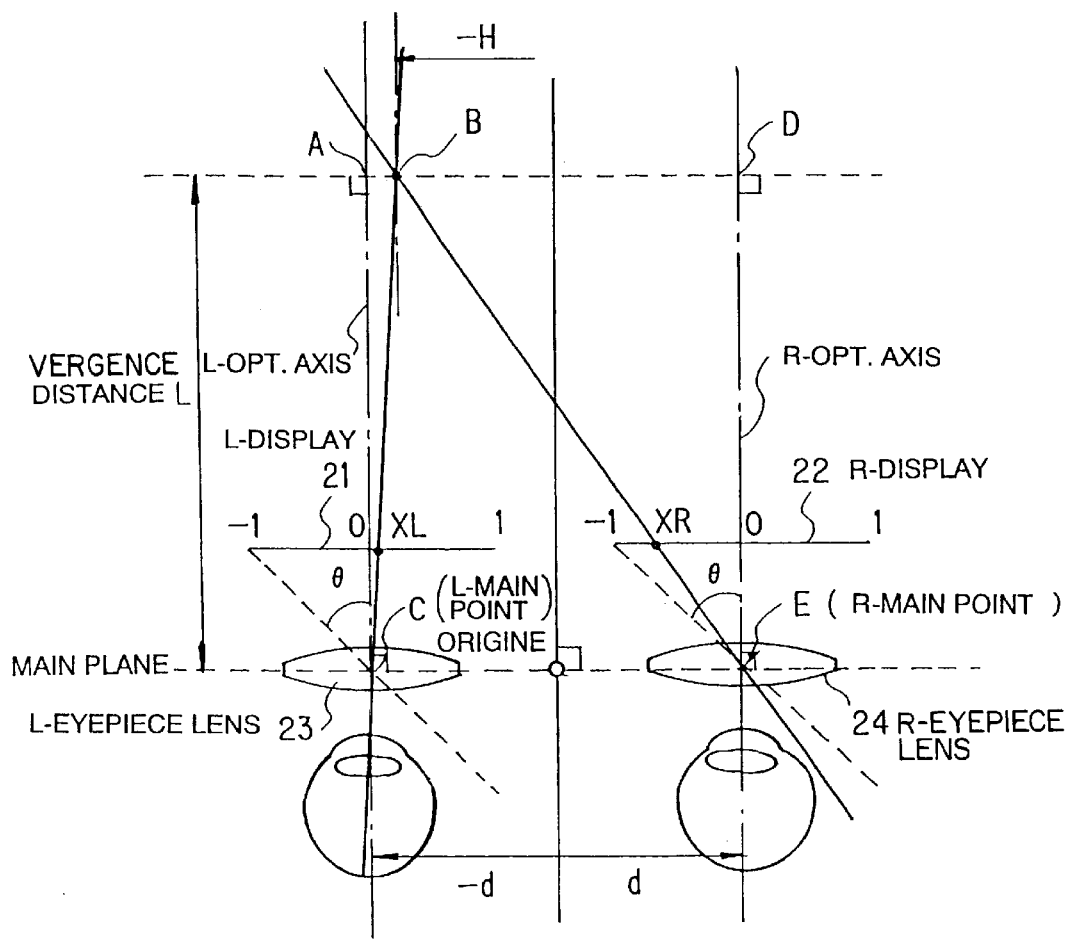
FIG. 11 is a drawing for explaining the depth control in the first embodiment.

As shown in FIG. 11, images displayed on a left and a right display surfaces 21 and 22 at horizontal positions XL and XR thereof, coincide with each other at position B. The distance from the point B to the principal plane of a left and a right eyepiece lenses 23 and 24 is referred to as vergence distance L. The positions XL and XR are expressed by following formulas (1) and (2).

$$XL=\{d+(-H)/L\cdot\tan\theta \qquad (1)$$

$$XR=\{-d+(-H)/L\cdot\tan\theta \qquad (2)$$

where d is the distance from the mid point (or origin) between the left and right eyepiece lenses to the centers thereof (i.e., a left and a right principal point C and E)) (the distance being positive on the right eye side and negative on the left eye side), θ is the half picture angle of the lenses, and −H is the horizontal distance of the point B.

Figure 12:
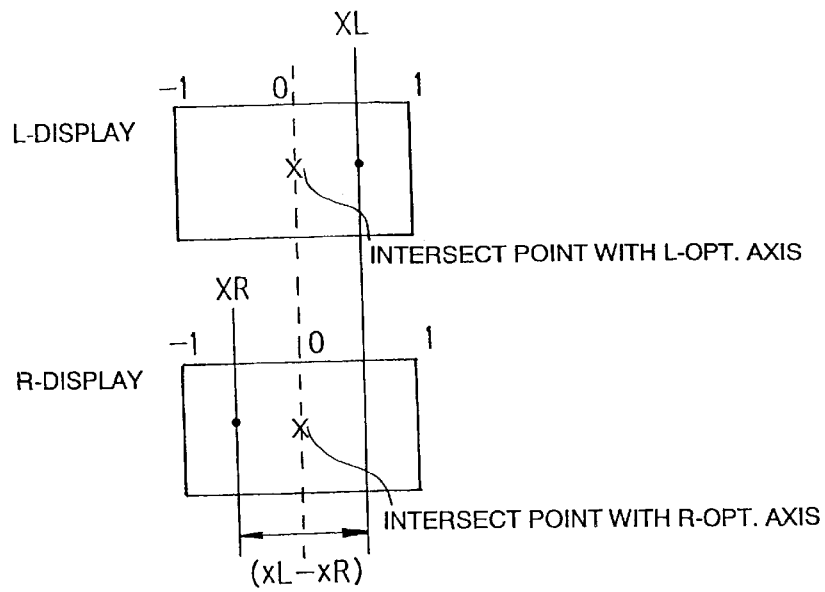
FIG. 12 is a drawing for explaining the horizontal positions of the left and right display surfaces in the first embodiment.

The horizontal positions XL and XR of the left and right display surfaces 21 and 22 are normalized by setting the point of intersection between the horizontal line of each of them and the optical axis in each display area to be "0"and, as shown in FIG. 12, setting the horizontal dimension of the display area to be "2". The formula (1) can be derived from the fact that the triangle having apex as points A, B and C in FIG. 11 and the triangle having apex as the origin O in the left display surface 21 and points XL and C are similar to each other. Likewise, the formula (2) can be derived from the fact that the triangle having apex as points D, B and E and the triangle having apex as the origin O in the right display surface and points XR and E.

From the above two formulas a formula $$XL-XR=2d/L\cdot\tan\theta \qquad (3)$$

is derived. The formula (3) represents the relation between the parallax (XL−XR) and the vergence distance L. Thus, the parallax should meet a condition given by following formula (2) in order to obtain coincidence of the vergence distance L and the glance distance I with each other.

$$XL-XR=2d/I\cdot\tan\theta \qquad (4)$$

In the depth control by the vergence distance control in (1), the parallax (XL−XR) is controlled such that it always satisfies the above formula (4). The control is made by shifting the entire images in the horizontal directions by the difference between the parallax (XL−XR) obtained in the step S5 and the formula (4). The shifts SL and SR of the left and right images are given as:

$$SL=-(XL-XR)+d/I\cdot\tan\theta \qquad (5)$$

$$SR=-(XL-XR)-d/I\cdot\tan\theta \qquad (6)$$

The sign "−" of SL and SR indicates that these shifts are in the leftward horizontal direction, and the sign "+" indicates that the shifts are in the rightward horizontal direction. When the parallax (XL−XR) is greater than the desired parallax, that is, when the vergence distance L is less than the glance distance I, the left image is shifted to the right, while shifting the right image to the right, thus obtaining coincidence of the vergence distance L and the glance distance I with each other. Conversely, when the parallax (XL−XR) is less than the desired parallax, that is, when the vergence distance L is greater than the glance distance I, the left image is shifted to the left while shifting the right image to the right, thus obtaining coincidence of the vergence distance L and the glance distance I with each other.

In the step S5, the images are shifted by calculating the shifts SL and SR in the formulas (5) and (6) according to the parallax (XL−XR) of the car images as obtained in the in the step S4. In the example of FIGS. 4(h) and 4(i), when the parallax (XL−XR) of the car images is greater than the desired parallax, the left image is shifted to the left while shifting the right image to the right.

(Step S6)

The left and right image signals having been depth controlled are supplied from the stereo image processor 2 to the HMD 3 for display thereon. The steps S1 to S6 are executed repeatedly.

Figure 13:
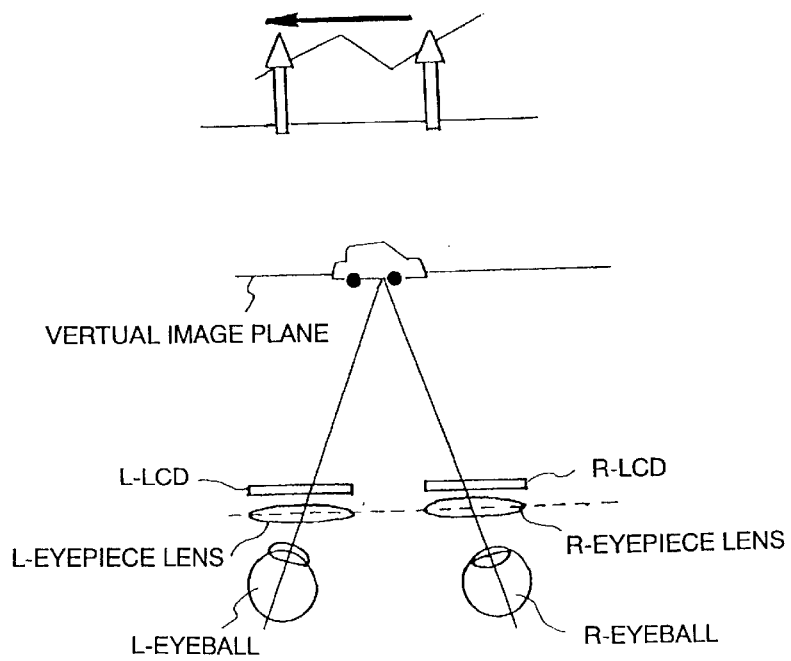
FIG. 13 is a view illustrating the status of observation of a stereo image in the first embodiment.

FIG. 13 is a view illustrating the status of observation of stereo image having been processed in the manner as described before in connection with the example shown in FIGS. 4(a) to 4(i). As is seen from FIG. 13, it is possible to observe a stereo image, which involves a car image obtained as a result of merging on a virtual image plane and a background image obtained as a result of merging at a distant position and proceeding to the left.

Figure 14:
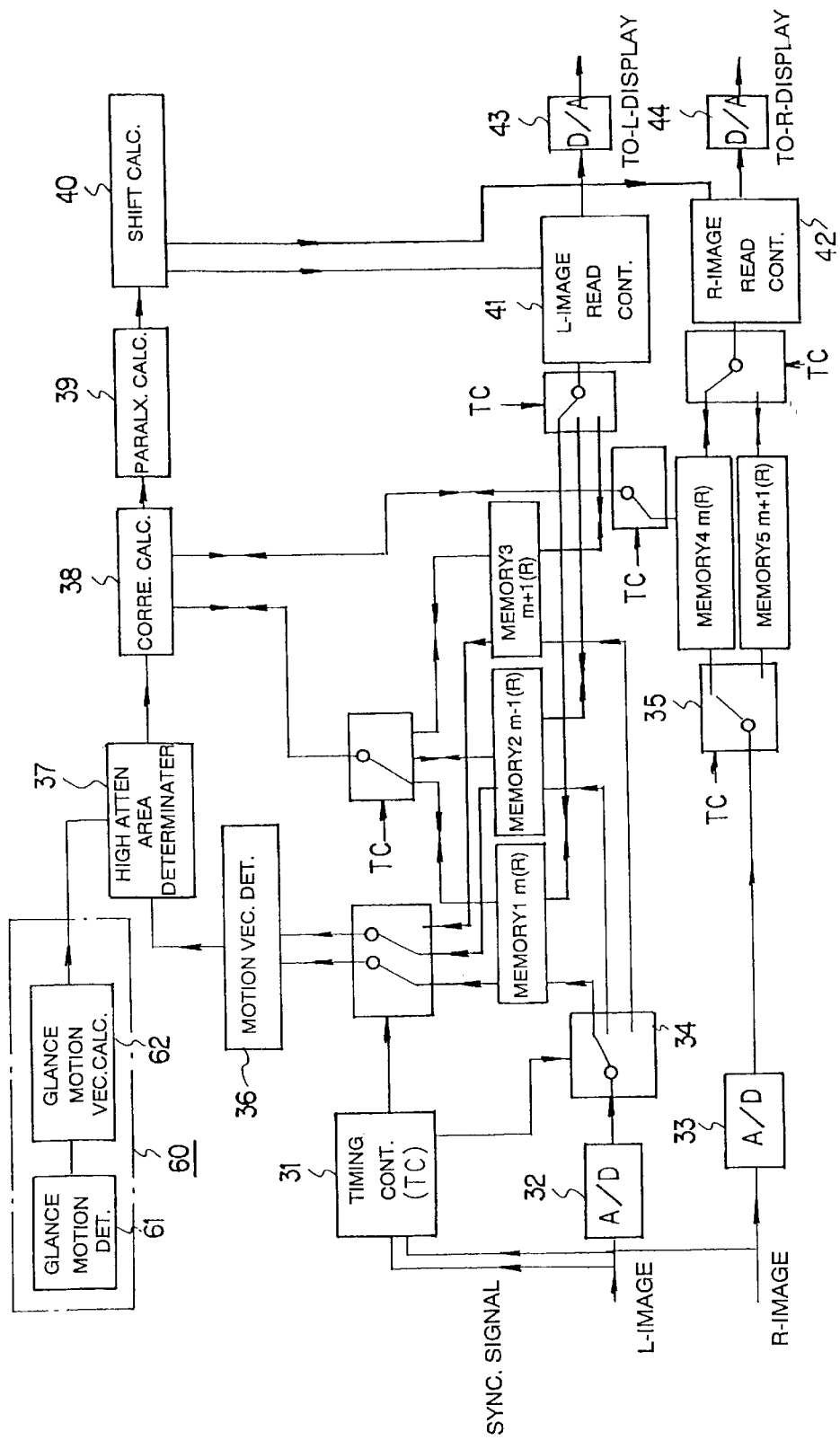
FIG. 14 is a block diagram showing the internal construction of the stereo image processor 2 in the first embodiment.

FIG. 14 is a block diagram showing the internal construction of the stereo image processor 2 in the first embodiment of the present invention. In the Figure, a block 60 in a left upper broken line rectangle (in which a glance motion vector calculator 62 processes a signal from a glance motion detector 61 and provides the processed signal), is a constituent of a fourth embodiment, and has no direct bearing on the first embodiment.

As shown in FIG. 14, when a left and a right image signal from the stereo image generator 1 are received, vertical sync signals separated from these image signals are supplied to a timing controller (TC) for controlling the timing of processing each block. Designated at TC is a signal corresponding to the above vertical sync signals.

The left and right image signals are A/D converted in A/D converters 32 and 33 and then selectively supplied through switches 34 and 35 to memories 1 to 5. The left image signal is stored in either one of the memories 1 to 3. More specifically, the memories 1 to 3 are cyclically switched for each field or frame by the switch 34, so that different image fields or frames are stored in the memories.

It is assumed that at instant m left image frames m(L) and m−1(L) are stored in the memories 1 and 2, respectively, and that the next left image frame m+1(L) is to be stored in the memory 3.

The memories 4 and 5 are switched by the switch 35, so that different right image frames are stored in these memories. It is assumed that right image frames m(R) and m+1(R) are stored in the memories 4 and 5, respectively.

Then, motion vector calculation is made by comparing the images stored in two of the memories 1 to 3. At the instant m the memories 1 and 2 are selected, and signals of the image frames m(L) and m−1(L) are supplied to a motion vector detector 26. The memory numbers of the selected memories are cyclically switched in successive timings. The above operation corresponds to the step S1. In the step S1, motion vectors of all the blocks are detected, and their mean is obtained.

The motion vector detector 36 divides each image into a plurality of blocks, and searches a block in one of the images that have a high correlation to each block in the other image. The difference in position between the compared blocks in the two images is a motion vector. This process is executed for each block, and each motion vector signal that is obtained is supplied to a high attention center presumable area determiner 37. The above operation corresponds to the step S2.

The high attention center presumable area determiner 37 determines a high attention center presumable area in a manner as shown in the flow chart of FIG. 9. The description will now be made with reference to the flow chart of FIG. 9.

In step S3-1, the determiner 37 checks for a local image area with a motion vector different from that of the remainder of the image. This check is made by determining the distribution value of all the motion vectors involved and checking whether the distribution value exceeds a prescribed value. The distribution value represents an extent of motion vector fluctuations in each of the plurality of image blocks, which the image is divided into.

When an image area with a different motion vector is detected in the step S3-1, step S3-2 is executed, in which the determiner 37 checks for a plurality of local image areas with different motion vectors. This check is made by retrieving for motion vectors deviated by at least 90% of deviation (or fluctuation) range of motion vectors, detecting coordinate positions of motion vectors deviated by at least 90% in the display surface, making labeling and checking that the labeling is made one or a plurality of times.

When only a single different motion vector image area is detected in the step S3-2, a step S3-3 is executed, in which the determiner 37 supplies a signal corresponding to the block number of a pertinent block which the labeling is performed for, as high attention center presumable area signal, to a correlation calculator 38.

When a plurality of different motion vector image areas are detected in the step S3-2, a step S3-4 is executed, in which the determiner 37 supplies a signal corresponding to the block number of a block, which the labeling is performed and has a center coordinate position closest to the display surface center, as high attention center presumable area signal to the correlation calculator 38.

When no local image area with any different motion vector is detected in the step S3-1, a step S3-5 is executed, in which the determiner 37 checks whether the mean value of all the motion vectors involved is zero. When it is determined in the step S3-5 that the motion vector mean value is zero, a step S3-6 is executed, in which the predictor 37 supplies a signal corresponding to the block number of a central block, preliminarily stored in it, as high attention center presumable area signal to the correlation calculator 38. When it is determined in the step S3-5 that the motion vector mean value is not zero, a step S3-7 is executed, in which the determiner 37 supplies a signal corresponding to the block number, which is obtained by shifting the above block number in the opposite direction to the motion vector mean value, as presumable attention center area signal to the correlation calculator 38.

The high attention center presumable area determiner 37 performs the above operation. The correlation calculator 38 will now be described. The correlation calculator 38 supplies the block number determined to represent a high attention center presumable area in the manner as described above directly to either one of the memories 1 to 3. At the instant m, the correlation calculator 38 supplies the above block number to the memory 1, in which the left image frame m(L) has been stored. For the right image, the correlation calculator 38 supplies the sum of the above block number and a horizontal redundant block number α, preliminarily stored in it (a presumable deviation corresponding to the parallax, which is to be added because it is necessary to determine an area z including the margin area specified by α and capable of covering the area specified by the block number for comparison of deviations on the left and right sides), to either one of the memories 4 and 5. At the instant m, the correlation calculator 38 supplies the sum block number to the memory 4, in which the right image frame m(R) has been stored. The memories 1 and 4 return image signals of the received block numbers to the correlation calculator 38. The correlation calculator 38 uses the left image signal as template for subtraction with respect to the right image signal by block-by-block shifting the left image. The correlation value is increased with reducing difference. The correlation calculator 38 supplies the difference corresponding to each shift to a parallax calculator 39.

Figure 10:
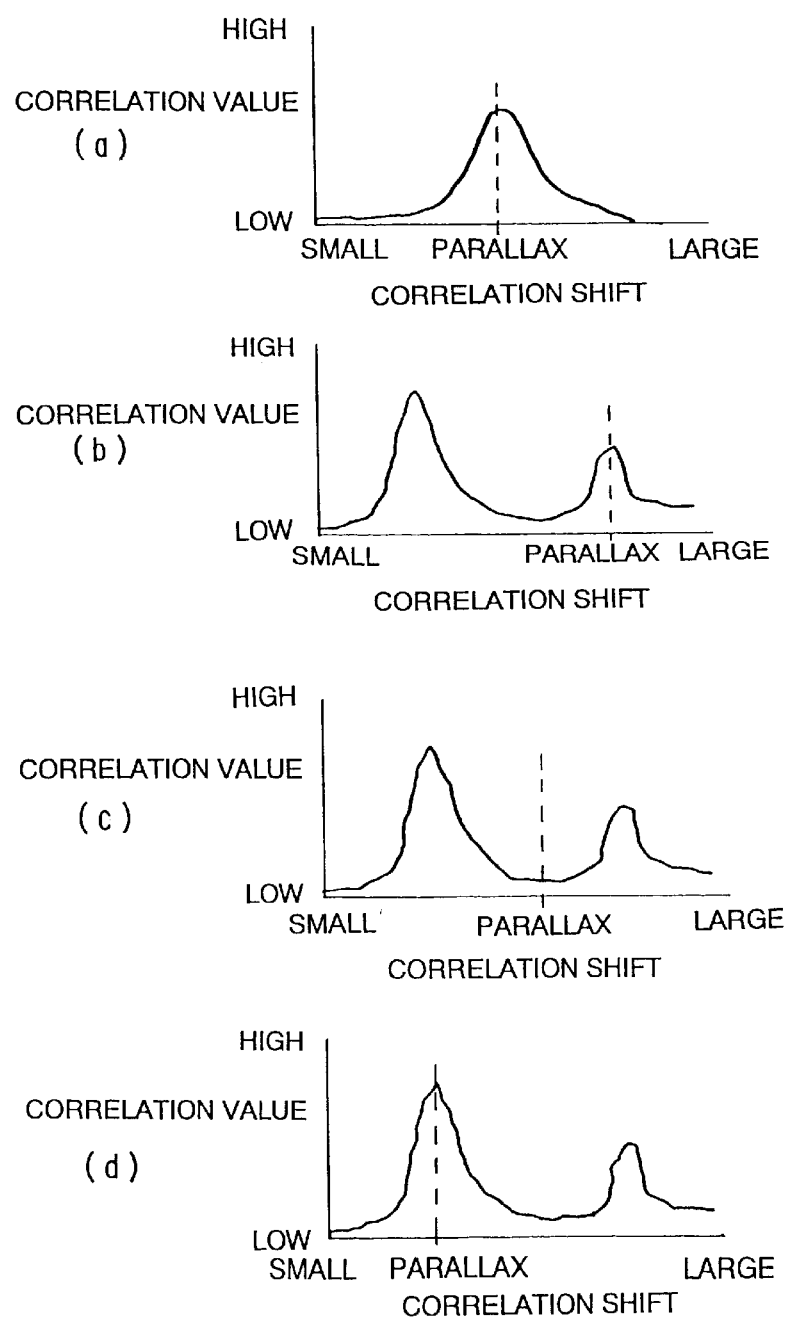
FIGS. 10(a)–(d) are drawings for explaining the parallax determination in the first embodiment.

The parallax calculator 39 obtains the final parallax by utilizing the supplied differences on the basis of the parallax determination method as shown in FIG. 10. The parallax is supplied to a shift calculator 40. This operation corresponds to the step S4.

The shift calculator 39 calculates the shifts of the left and right images given by the formulas (5) and (6), and supplies the calculated shifts to a left and a right image read controllers 41 and 42, respectively. The image read controllers 41 and 42 cause reading of image signals in the memories by providing the calculated shifts. This operation corresponds to the step S5.

The read-out left and right image signals are D/A converted in D/A converters 43 and 44 and then supplied to the left and right display devices of the HMD 3 for display. This operation corresponds to the step S6.

In the first embodiment as described above, motion vectors brought about in image on either display surface are detected, a local image area with a motion vector different from that of the remainder of the display surface is detected, depth of the image in the detected image area is obtained, and glance distance and vergence distance in stereo image observation are controlled to be coincident with each other. In this embodiment, no glance motion detector is needed, and it is thus possible to reduce the size and price of the unit.

Now a second embodiment of the present invention, which detects left and right image motion vectors, will be described.

In the first embodiment, motion vectors were obtained with only left or right images. The second embodiment is a modification of the first embodiment, and adapted to obtain motion vectors with both left and right images.

Figure 15:
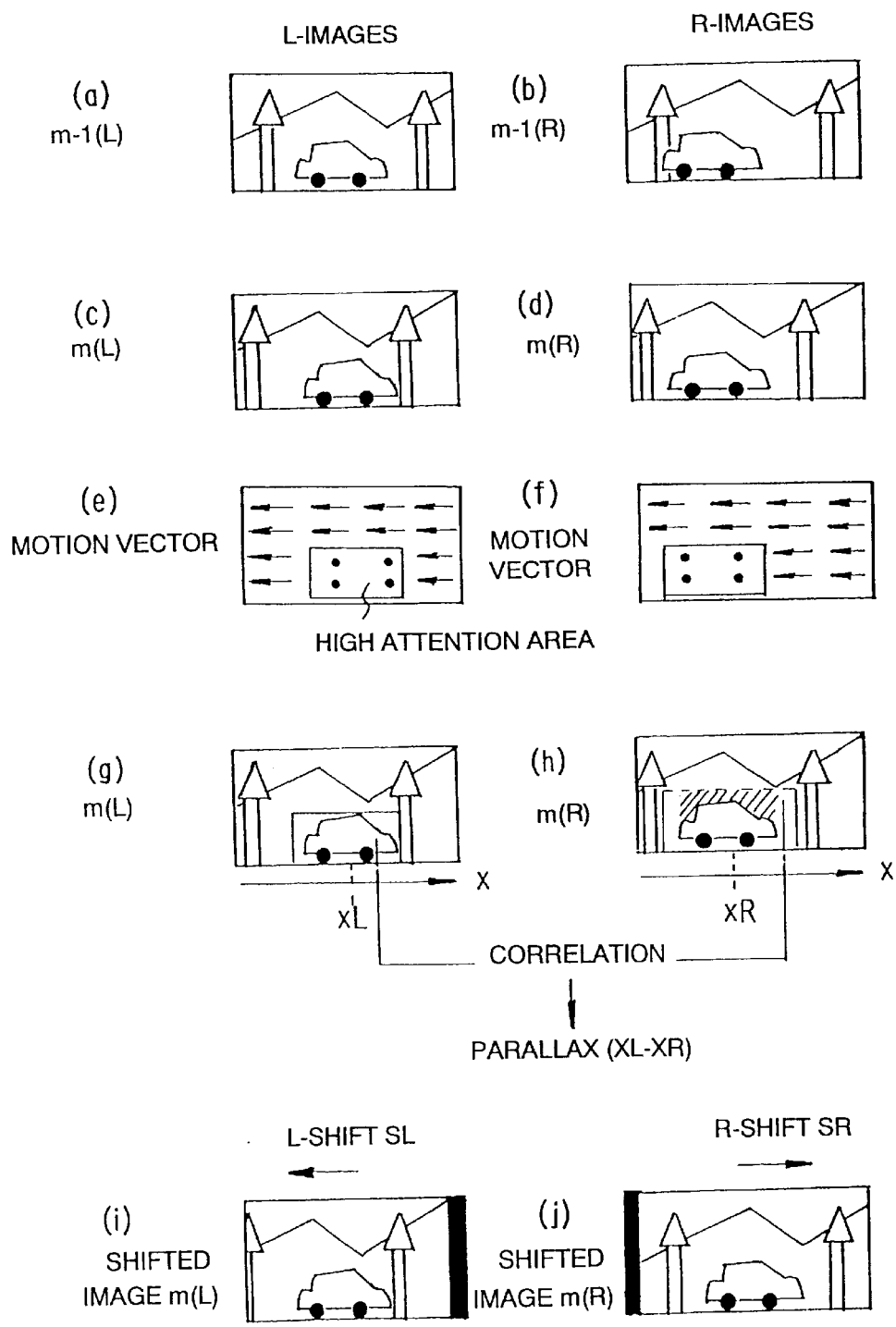
FIG. 15 is a view outlining the second embodiment of the stereo image display unit according to the present invention.

For example, as shown in FIGS. 15(a) to 15(j) with left images as shown in FIGS. 15(a) and 15(c) motion vectors as shown in FIG. 15(e) are obtained, and with right images as shown in FIGS. (b) and (d) motion vectors as shown in FIG. 15(f) are obtained. Then, respective high attention center presumable areas as shown in FIGS. 15(g) and 15(h) are determined.

Then, the center x coordinates xL and xR of the presumable attention center areas are obtained. The difference (xL−xR) between the x coordinates xL and xR is determined to be the parallax. Thus, in the second embodiment no correlation calculation is made.

Figure 16:
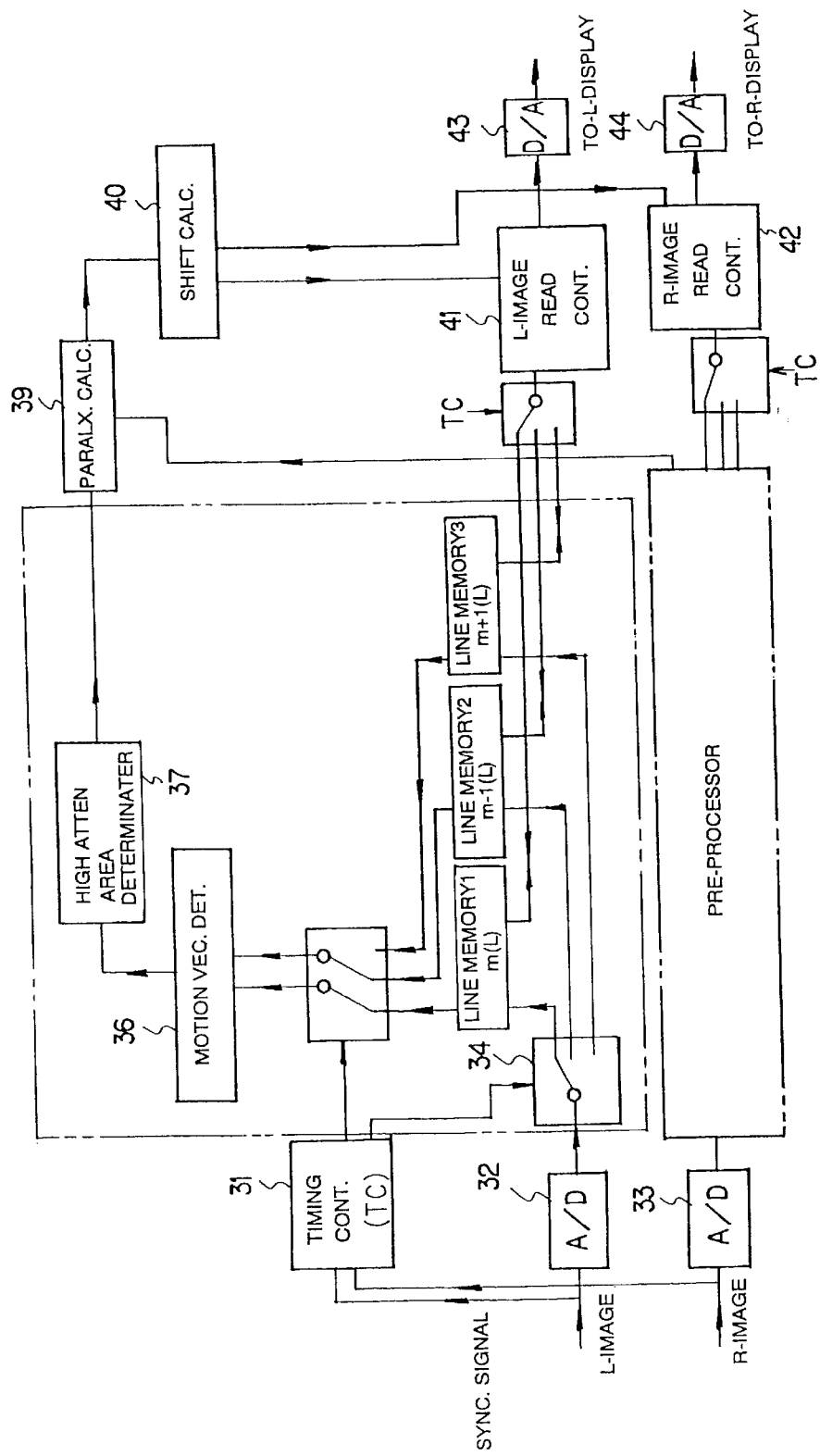
FIG. 16 is a block diagram showing the internal construction of the second embodiment of the stereo image display unit.

FIG. 16 is a block diagram showing the internal construction of the second embodiment of the stereo image display unit. The processing involved is common to the left and right images up to the high attention center presumable determiner 37. Thus, the common part for the left image is shown enclosed in a broken line rectangle, while omitting the other common part. The high attention center presumable area determiners 37 for the left and right images supply the center x coordinates xL and xR to the parallax calculator 39. The parallax calculator 39 calculates (xL−xR), and supplies this result to the shift calculator 40. The subsequent processing is the same as in the first embodiment, and is not described.

Since in this embodiment the parallax is obtained without correlation calculation, it is possible to reduce the processing time.

Next, a third embodiment of the present invention, which performs field sequential, will be described.

The third embodiment is also a modification of the first embodiment, and effective for field (or frame) sequential stereo image. Specifically, in this embodiment the parallax is obtained by detecting motion vectors between left and right images at different time instants and determining a parallax based on a high attention center presumability.

Figure 17:
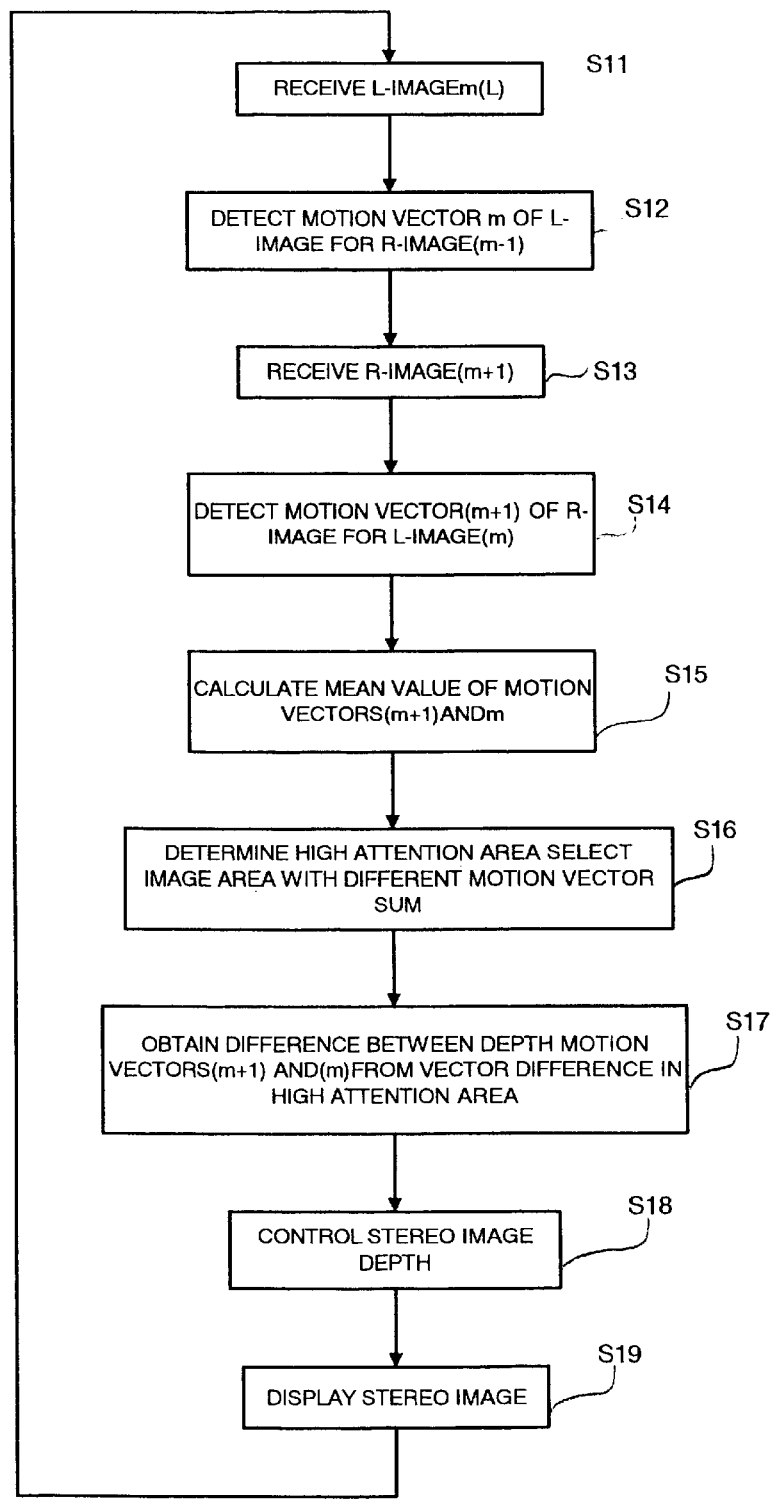
FIG. 17 is a flow chart illustrating the operation in the third embodiment.
Figure 18:
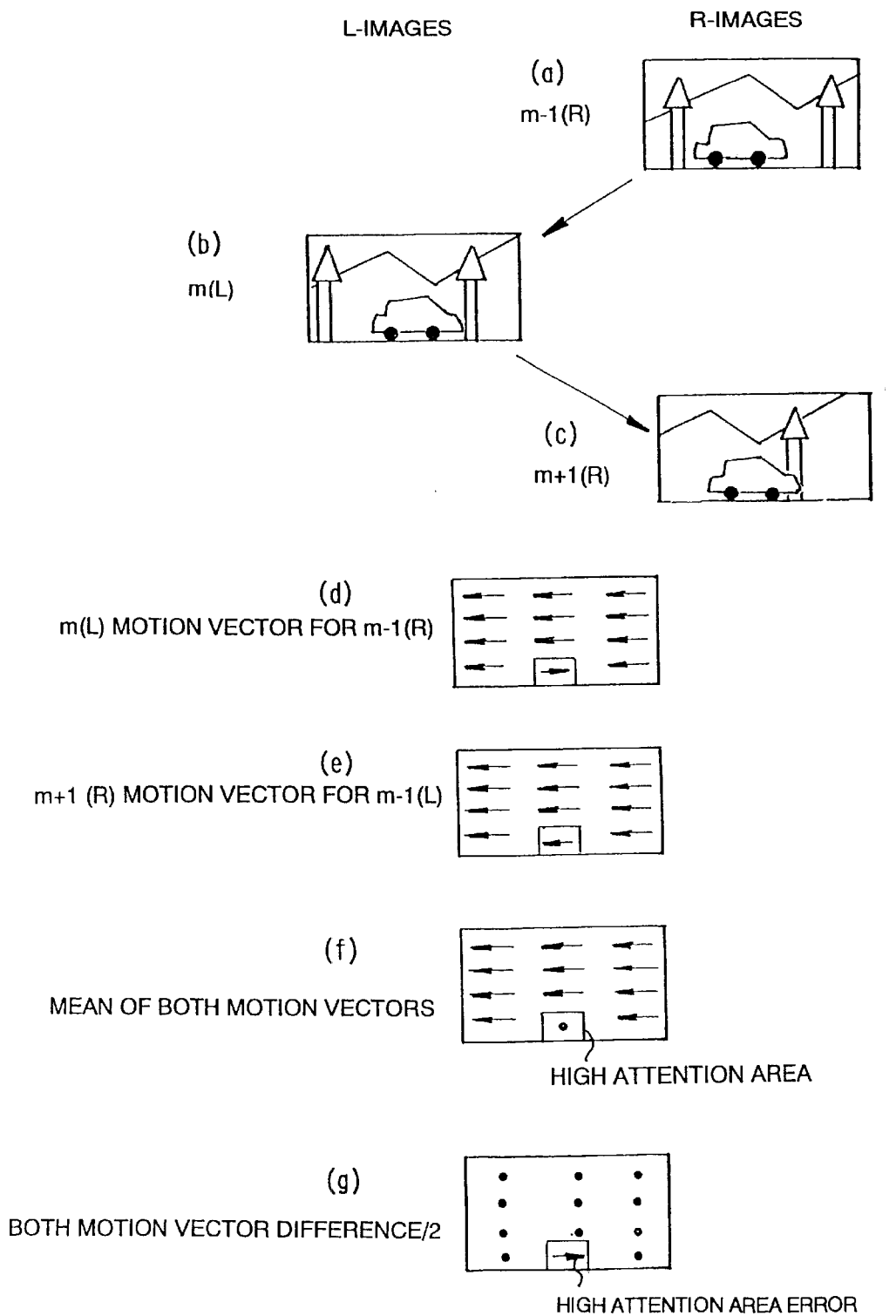
FIGS. 18(a) to 18(g) are exemplary images after processing according to the third embodiment.

FIG. 17 is a flow chart illustrating the operation in the third embodiment. The operation will now be described in connection with an example of image processing shown in FIGS. 18(a) to 18(g). In this embodiment, left and right image frames are received alternately, such as right image frame m−1(R), left image frame m(L) and right image frame m+1(R) . . . as shown in FIGS. 18(a), 18(b) and 18(c).

(Step S11)
The left image frame m(L) is received.

(Step S12)
A motion vector m of the left image frame m(L) with respect to the right image frame m−1(R) for each block. That is, a motion vector is obtained by comparing adjacent image fields (i.e., comparing left and right image fields). The result thus includes the parallax between the left and right images. FIG. 18(d) shows an example of the result. As shown, a leftward motion vector is obtained with the background image area. A motion vector corresponding to the parallax is obtained with the car image area.

(Step S13)
The right image frame m+1(R) is received.

(Step S14)
A motion vector of the right image frame m+1(R) with respect to the left image frame m(L) is obtained for each block. FIG. 18(e) shows an example of the result. Like the case of FIG. 18(d), a leftward motion vector is obtained with the background image area. With the car image area, on the other hand, a motion vector corresponding to the parallax and in the opposite direction to that in FIG. 18(d) is obtained.

(Step S15)
The mean value of the motion vectors shown in FIGS. 18(d) and 18(e) are obtained for each block. This is made so because of cancellation of motion vectors corresponding to the parallax with an object moving at a uniform speed. With the background image a leftward motion vector is obtained, and with the car image zero motion vector is obtained.

(Step S16)
Using the mean motion vector thus obtained, high attention center presumability are determined as in the first embodiment is made. In the case of FIGS. 18(a) to 18(g), the zero motion vector area is selected to be a high attention center presumable area because of cancellation of the motion vectors corresponding to the parallax with an object moving at a uniform speed.

(Step S17)
For each block, the motion vector as shown in FIG. 18(e) is subtracted from the motion vector as shown in FIG. 18(d), and the difference is divided by two. By so doing, the motion of the background is canceled, and a parallax vector is obtained. FIG. 18(g) shows the result. As shown, zero vector is obtained with the background image, and a rightward parallax vector is obtained with the car image. The parallax vector is depth information of the car image.

Subsequent steps are the same as in the first embodiment, and not described.

Figure 19:
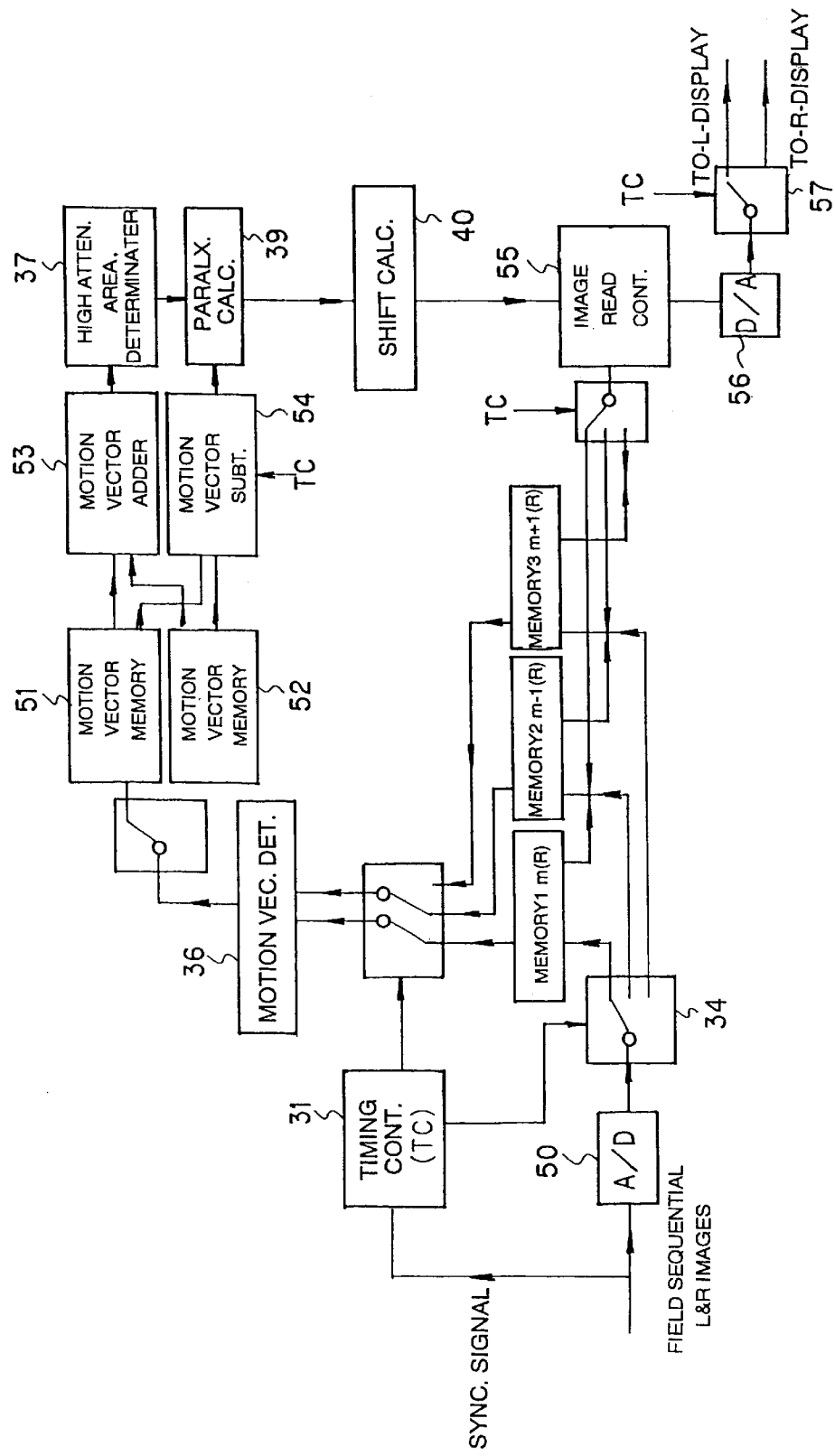
FIG. 19 is a block diagram showing the internal construction of the third embodiment of the stereo image display unit.

FIG. 19 is a block diagram showing the internal construction of the third embodiment of the stereo image display unit. Left and right image signals received alternatively for every field are A/D converted in an AS/D converter 50 and then stored in the memories 1 to 3.

It is assumed that at instant m image fields m(L) and m−1(R) are stored in the memories 1 and 2, respectively, and next image field m+1(R) is to be stored in the memory 3. Of these three memories, two are selected, and their contents are supplied to a motion vector detector 36.

At the instant m the memories 1 and 2 are selected, and read-out image signals are supplied to the motion vector detector 36. The motion vector detector 36 detects a motion vector concerning the images stored in the two selected memories, and provides the detected motion vector. The motion vector thus provided is stored in a first motion vector memory 51. At next instant m+1 the memories 1 and 3 are selected, and a motion vector concerning the two images is detected. The detected motion vector is stored in a second motion vector memory 52.

Then, signals representing the motion vectors stored in the first and second motion vector memories 51 and 52 are supplied to a motion vector adder 53. The sum result obtained in the motion vector adder 53 is supplied to a high attention center presumable area determiner 37. The high attention center presumable area determiner 37 has the same function as the presumable attention center area determiner 37 in the block diagram of FIG. 14 showing the first embodiment. The high attention center presumable area determiner 37 discriminates an area showing a relatively unique calculation result, and supplies the block number of that area to a parallax calculator 39.

The motion vectors stored in the first and second motion vector memories 51 and 52 are also supplied to a motion vector subtracter 54. The difference result obtained in the motion vector subtracter 54 is supplied to the parallax calculator 39. The parallax calculator 39 determines the parallax on the basis of the motion vector corresponding to the block number, received from the difference result received from the motion vector subtracter 54, and supplies a signal representing the determined parallax to a shift calculator 40 for shift calculation. According to the calculated shift, the images stored in the memories 1 to 3 are read out under shift control of a display image read controller 55. The read-out images are A/D converted in a D/A converter 56, and then switched for each field by a switch 57 for being supplied to a left and a right display device.

The third embodiment is adapted for field sequential stereo image, and the motion vector detector 36 also serves the role of the correlation calculator 38 in the first embodiment. Thus, the unit may comprise a reduced number of components, and can be manufactured correspondingly inexpensively.

A fourth embodiment utilizing glance motion vectors will be described.

The fourth embodiment is again a modification of the first embodiment, and adapted to detect an inter-image motion vector and an observer's glance motion vector and determine a presumable attention center area from comparison of the two motion vectors.

For the observer's glance motion vector detection, a glance motion detector provided in the HMD 3 is utilized. The glance motion detector is used not for checking the absolute coordinates of the glance as in the prior art but for the purpose of detecting absolute variations of the glance. Thus, the glance motion detector need not be highly accurate, and also no calibration or the like is needed to determine the absolute coordinates of the glance.

Figure 20:
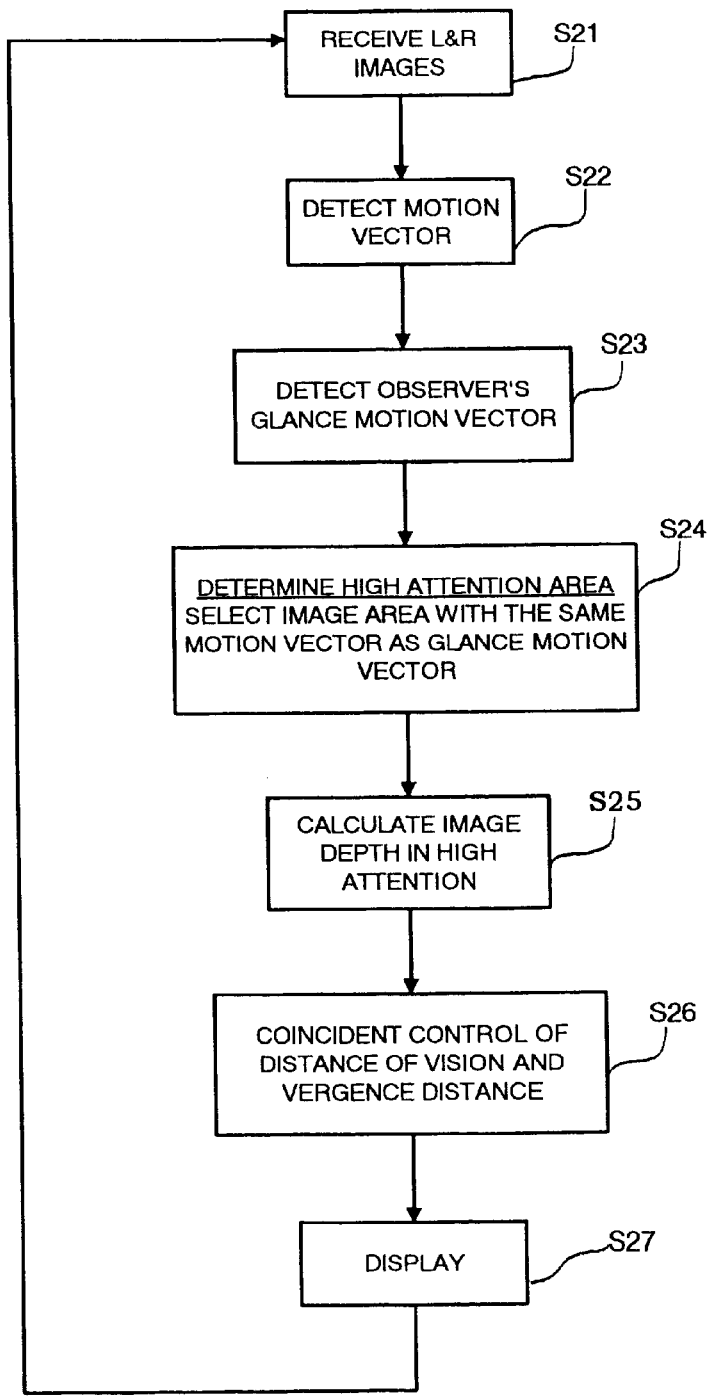
FIG. 20 is a routine of the processing in the fourth embodiment.

FIG. 20 is a flow chart illustrating the operation in the fourth embodiment. As is seen from the comparison of this flow chart with the flowchart of FIG. 3 illustrating the operation in the first embodiment, this embodiment is substantially the same as the first embodiment except for main differences, that "observer's glance motion vector detection" (Step S23) is newly added, and that "coincidence control of glance and vergence distances" (step S26) is provided in lieu of the "depth control of stereo image" (Step S5).

Like the first embodiment, motion vectors are detected, and at the same time an observer's glance motion vector is detected. Then, an image area having the same vector as the detected glance motion vector, among all the detected motion vectors, is determined to be a high attention center presumable image area.

Figure 21:
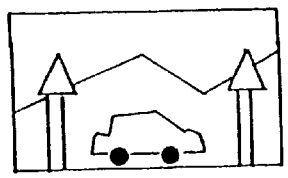
FIGS. 21(a)–(c) are exemplary images that are processed in the fourth embodiment.
Figure 21:
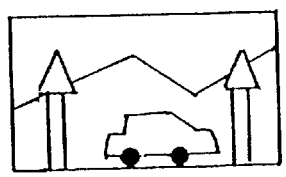
Figure 21:
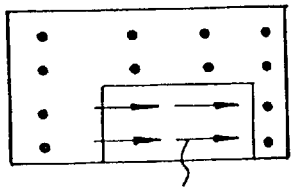
Figure 21:
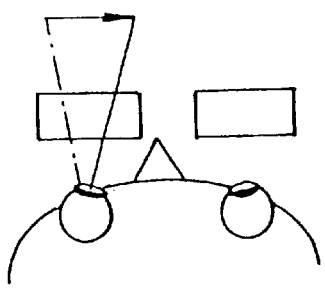

In the "observer's glance motion vector detection" in the step S23, it is difficult to detect the absolute value of the glance detection, although it is relatively easy to accurately detect change $\Delta\theta$ in the glance direction angle. Accordingly, in this embodiment a high attention center presumable area is specified according to the block position in the display surface corresponded by the motion vector corresponding to $\Delta\theta$. Thus, a motion vector as shown in FIG. 21(c), for instance, is obtained.

Then, an inter-frame glance motion vector is detected. When the detected glance motion vector is directed to the right as shown in FIG. 21(d), the rightward motion vector area is made to be a high attention center presumability are as shown in FIG. 21(c).

The internal construction of the fourth embodiment of the stereo image display unit is shown by the whole block diagram in FIG. 14, including a left upper broken line rectangle block 60 (for providing a glance vector signal obtained by calculation in a glance motion vector calculator 62 according to a signal from a glance motion detector 61).

In the fourth embodiment, unlike the first embodiment, the a high attention center presumable area is determined not from the sole image but is determined by also using the glance motion detector 61 for detecting motion of the glance. This embodiment thus can cope with even the case where the high attention center presumable area varies greatly with the observer.

Next, a fifth embodiment which obtains motion vector concerning sole edge area will be described.

The fifth embodiment is a modification of the first embodiment, and adapted to detect motion vector of only an edge Image area and, when a different motion vector edge image area is detected, selecting this area to be a high attention center presumable image area, while otherwise selecting a central image area to be a high attention center presumable area.

Figure 22:
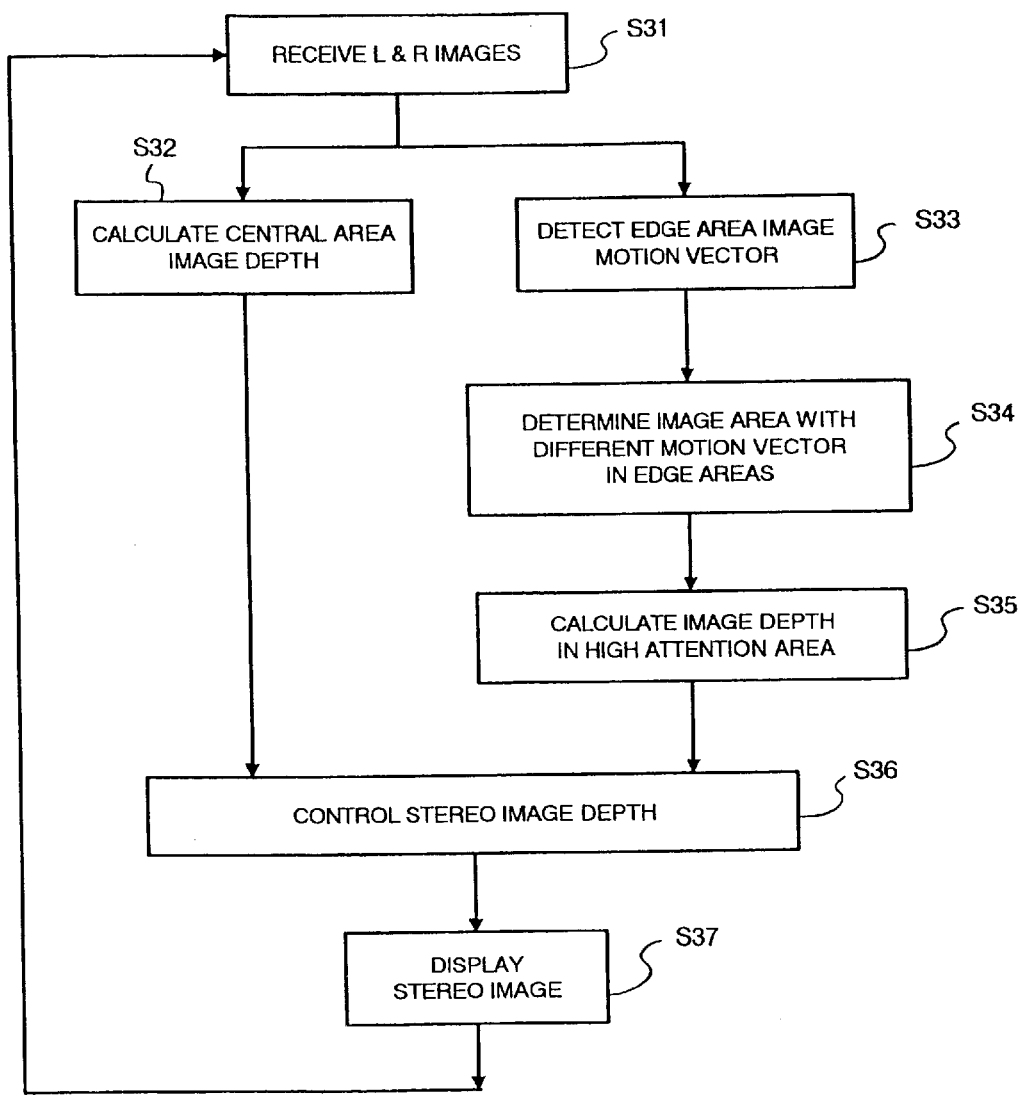
FIG. 22 is a routine of the processing in the fifth embodiment.
Figure 23:
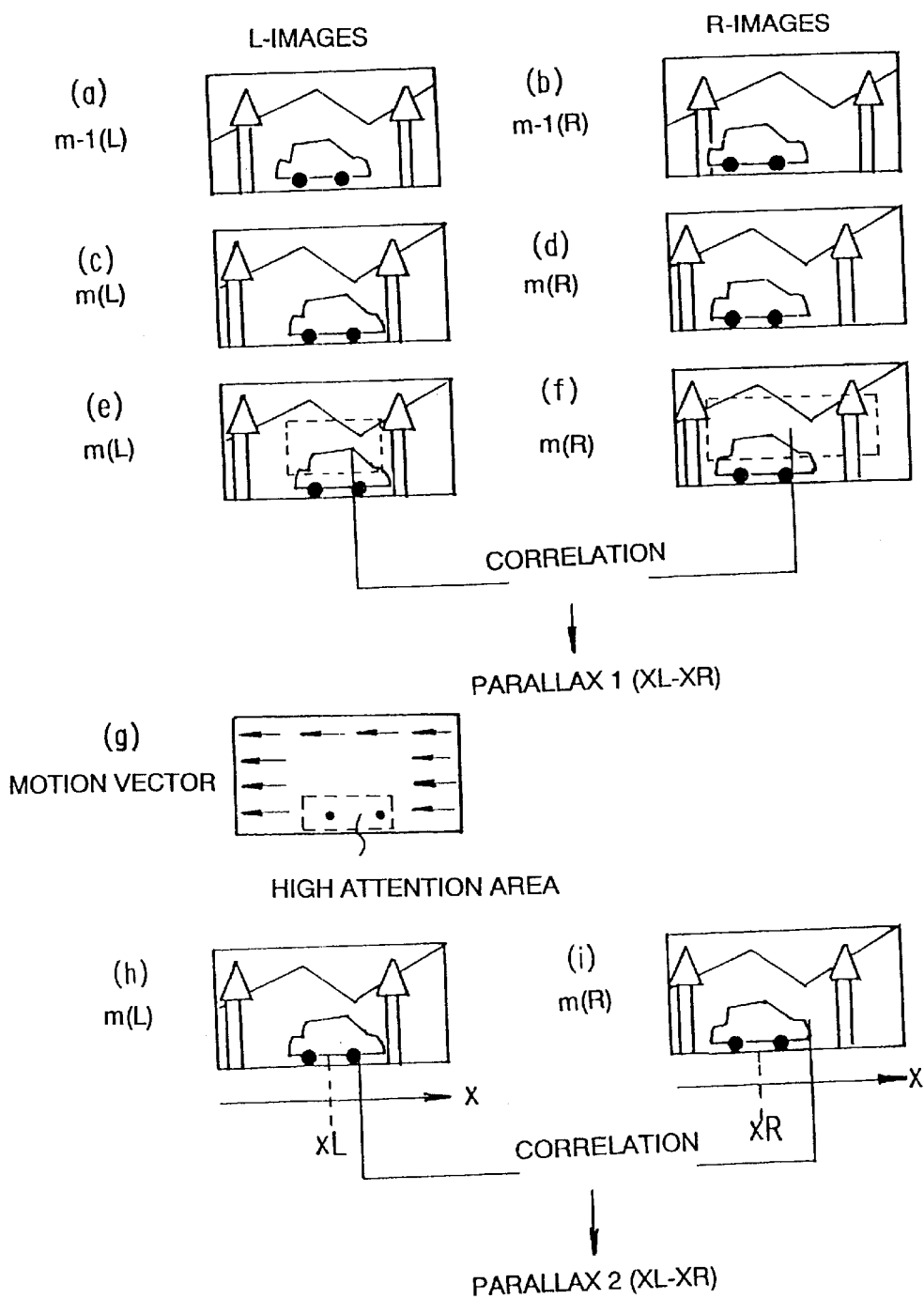
FIGS. 23(a)–(I) are exemplary images that are processed in the fifth embodiment.

FIG. 22 is a flow chart illustrating the operation in the fifth embodiment. FIGS. 23(a) to 23(i) are views illustrating an example of image processing used for describing the operation in the flow chart.

(Step S31)
Left and right image signals as shown in FIGS. 23(a) to 23(d) are successively received.

(Step S32)
The depth distance of a image in a central area of the display surface is calculated. Then, the parallax 1 is obtained by making correlation calculation using images in central areas of the left and right images as shown in FIGS. 23(e) and 23(f).

(Step S33)
A motion vector of an image in an edge area is detected. A motion vector as shown in FIG. 23(g) is obtained.

(Step S34)
A presumed attention center area is selected in the same process as in the high attention center presumable area determination in the first embodiment. Specifically, an image area with a different motion vector in the edge image area is specified (or determined). A dashed line rectangle area as shown in FIG. 23(g) is a high attention center presumable area.

(Step S35)
The depth distance concerning the high attention center presumable area is calculated in the same manner as in the first embodiment. Parallax 2 as shown in FIGS. 23(h) and 23(i) is obtained by making correlation calculation.

(Step S36)
A stereo image depth control value is determined from the central image depth distance obtained in the step S32 and the high attention center presumable area depth distance obtained in the step S35. This control value is determined in the same manner as the determination method as shown in FIG. 10.

When no different motion vector image area is detected in the step S34, the depth control is made by using the central image depth distance. When a different motion vector area is detected in the step S34, the final parallax is obtained by using the two parallax values, i.e., parallaxes 1 and 2 shown in FIG. 23.

(1) The greater parallax is made to be the final parallax from the consideration that the observer will fix attention center to front side image.

(2) The observer may observe both the images. To be able to cope with such a case as well, the mean value of a plurality of parallax values is made to be the final parallax.

(3) The parallax corresponding to the greatest correlation peak in obtaining parallaxes is made to be the final parallax from the consideration in the correlation comparison that the observer will fix the attention center to the highest contract image area.

Subsequent processing is he same as in the first embodiment.

Figure 24:
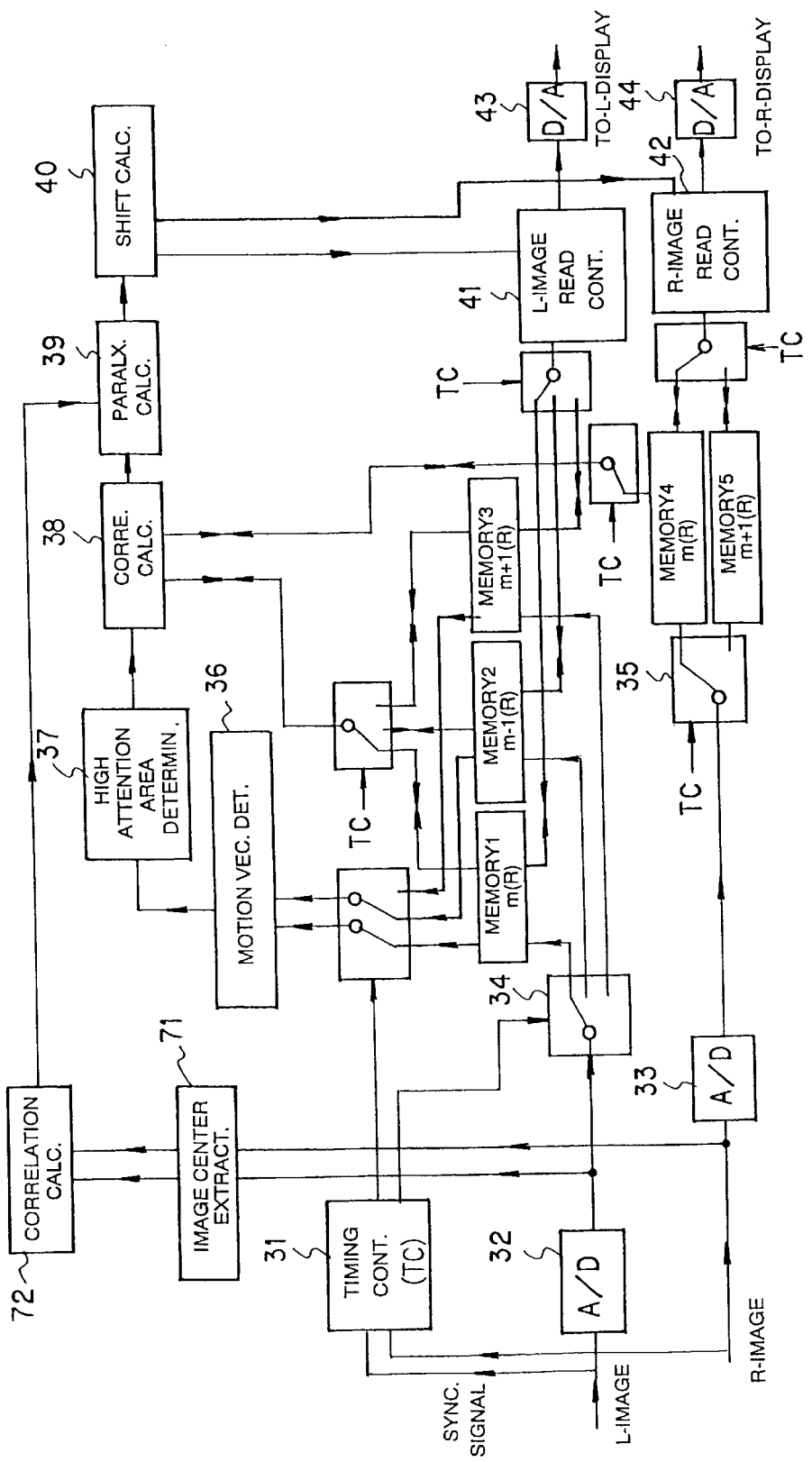
FIG. 24 is a block diagram showing the internal construction of the fifth embodiment of the stereo image display unit.

FIG. 24 is a block diagram showing the internal construction of the fifth embodiment of the stereo image display unit. The unit is different from the unit as shown in FIG. 14 as follows.

The A/D converted left and right image signals from the A/D converters 32 and 33 are coupled through two different routes. In one of the routes, the left and right image signals are processed in the same manner as in the case of FIG. 14. The motion vector detection, however, is made only with edge image. An edge image motion vector detector 36 executes extraction of edge image area data and comparison of the extracted data (i.e., motion detection). Specifically, the detector 36 executes motion vector detection by receiving only edge image signals from the memories 1 to 3, and supplies the detected motion vector to the high attention center presumable area determiner 37.

In the other route, a central image extractor 71 extracts only central image signals from the received left and right image signals, and supplies the extracted central image signals to a correlation calculator 72 for correlation calculation concerning only the left and right central images. The result of the correlation calculation is supplied to a parallax calculator 39. The parallax calculator 39 determines the final parallax using the correlation calculation result received from the correlation calculator 72 and that received from the correlation calculator 38 as described before in connection with FIG. 14 by the determination method as described before. Subsequent processing is the same as in the first embodiment.

In this embodiment, the motion vector detection concerning the sole edge image area and the calculation of the depth distance of the central image area with the highest probability of being a high attention center presumable area are performed simultaneously, and it is possible to greatly reduce the total processing time. In addition, in this embodiment the three methods (1) to (3) of obtaining the final parallax are taken into considerations in the high attention center presumable area determination, and it is thus possible to obtain determination which is more adapted for the purpose.

A sixth embodiment of the present invention which uses low accuracy glance motion detector will be described.

The sixth embodiment is a modification of the sixth embodiment, and adapted to be able to cope with the case of presence of a plurality of different motion vector areas in high attention center presumability area determination and determine one of the different motion vector areas by using an observer's glance signal from a glance motion detector. The glance motion detector used here can detect absolute flange position coordinates, but it may have as low angle detection accuracy of about ±5 degrees.

Figure 25:
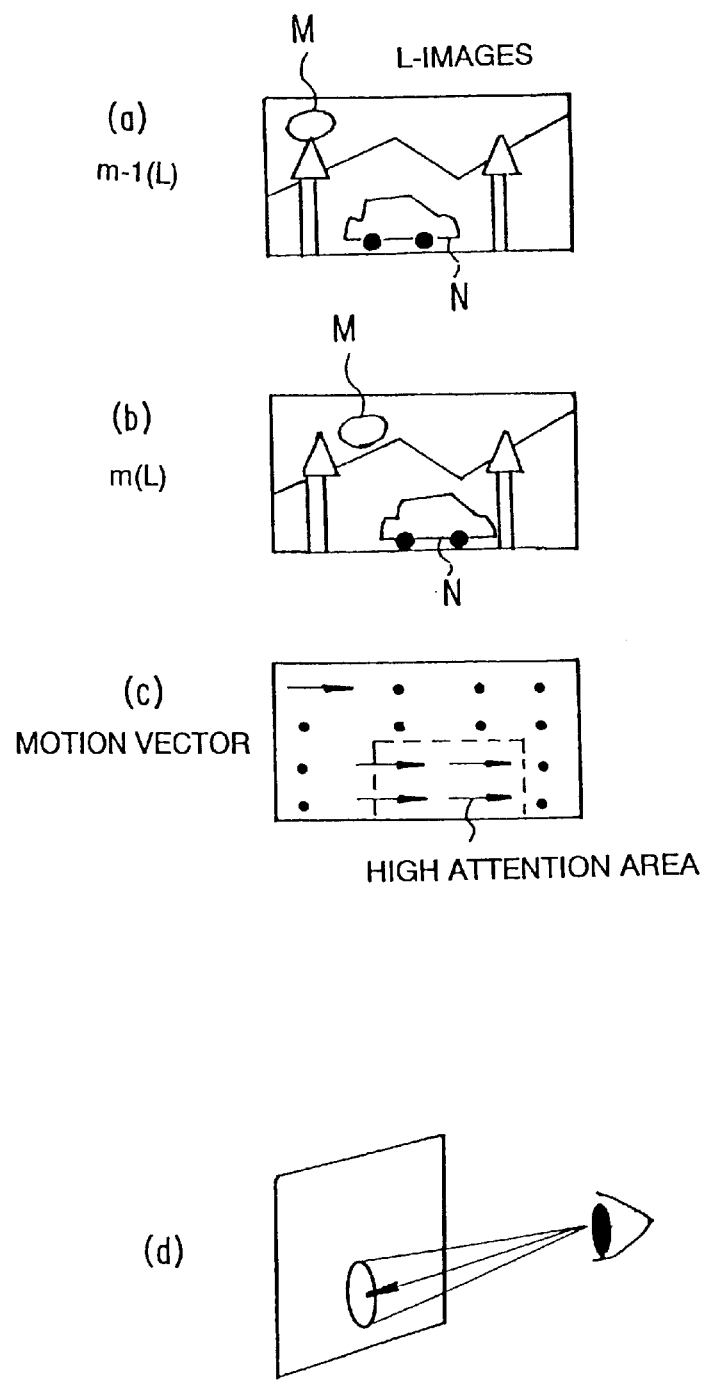
FIGS. 25(a)–(d) are exemplary images that are processed in the sixth embodiment.

As shown in FIGS. 25(a) to 25(c), in the case of presence of two different motion vector areas M and N, when the low angle detection accuracy glance motion detector (for instance with an accuracy of about ±5 degrees) detects data that the observer is observing a central lower area as shown in FIG. 25(d), a motion vector in an area in that central lower area is selected.

This embodiment, unlike the first embodiment, does not determine a high attention center presumable area from sole image, and this capable of accurately coping with the case where the high attention center presumable area greatly varies with the observer.

A seventh embodiment of the present invention will be described.

In this embodiment, edge image difference is used in lieu of motion vectors used in the first embodiment, and a peculiar change image area in each display surface is obtained and made to be an observer's high attention center presumable area. Subsequently, like the first embodiment the depth distance of the image in each attention center area is obtained, and the glance and vergence distances in stereo image observation are controlled to be coincident with each other.

Figure 26:
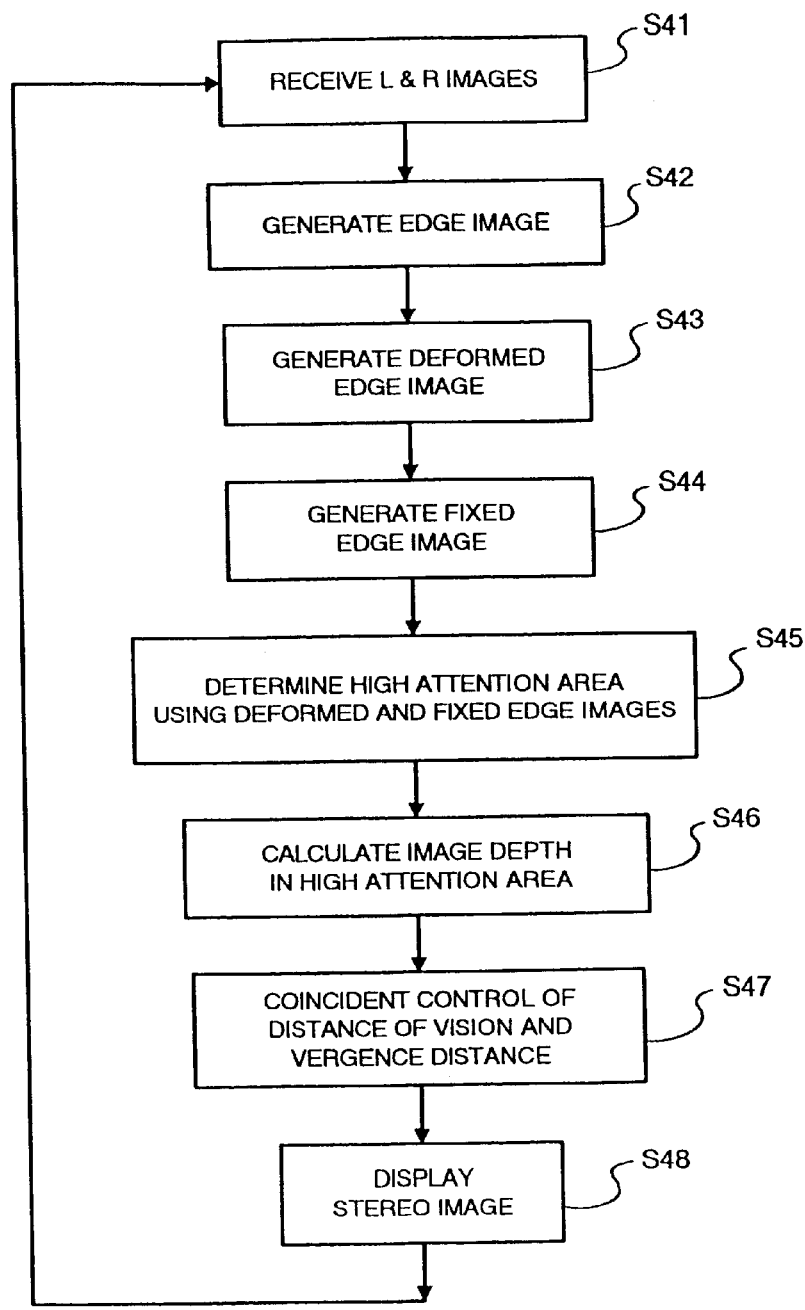
FIG. 26 is a routine of the processing in the seventh embodiment.

FIG. 26 is a flow chart illustrating the operation in the seventh embodiment. Specifically, the flow chart illustrates an operation, which left and right image signals provided from the stereo image generator 1 as shown in FIG. 1 are subjected to image processing in the stereo image processor 2 and then image display on the HMD 3. The operation will now be described by also having reference to other Figures.

(Step S41)

Left and right images provided successively from the stereo image generator 1 are received by the stereo image processor 2. Like the previous description of the first embodiment, it is assumed that the processor 2 receives the left and right image frames m−1(L) and m−1(R) shown in FIGS. 4(a) and 4(b) and then the left and right image frames m(L) and m(R) shown in FIGS. 4(c) and 4(d). As described before, these images are such that the car remains at a predetermined position on the display surfaces and only the backgrounds is moving.

(Step S42)

The stereo image processor 2 generates edge images by executing edge extraction of the received mages successively. Shown in FIGS. 27(a) to 27(d) are edge images corresponding to FIGS. 4(a) to 4(d). These edge images are in binary form, with edge portions represented by "1" and the other portion by "0".

(Step S43)

Inter-frame deformed parts of edge images are detected. The detection is made such that a difference image is generated by subtracting the preceding edge image frame from the present edge image frame. Negative difference values are made to be "0".

Figure 27:
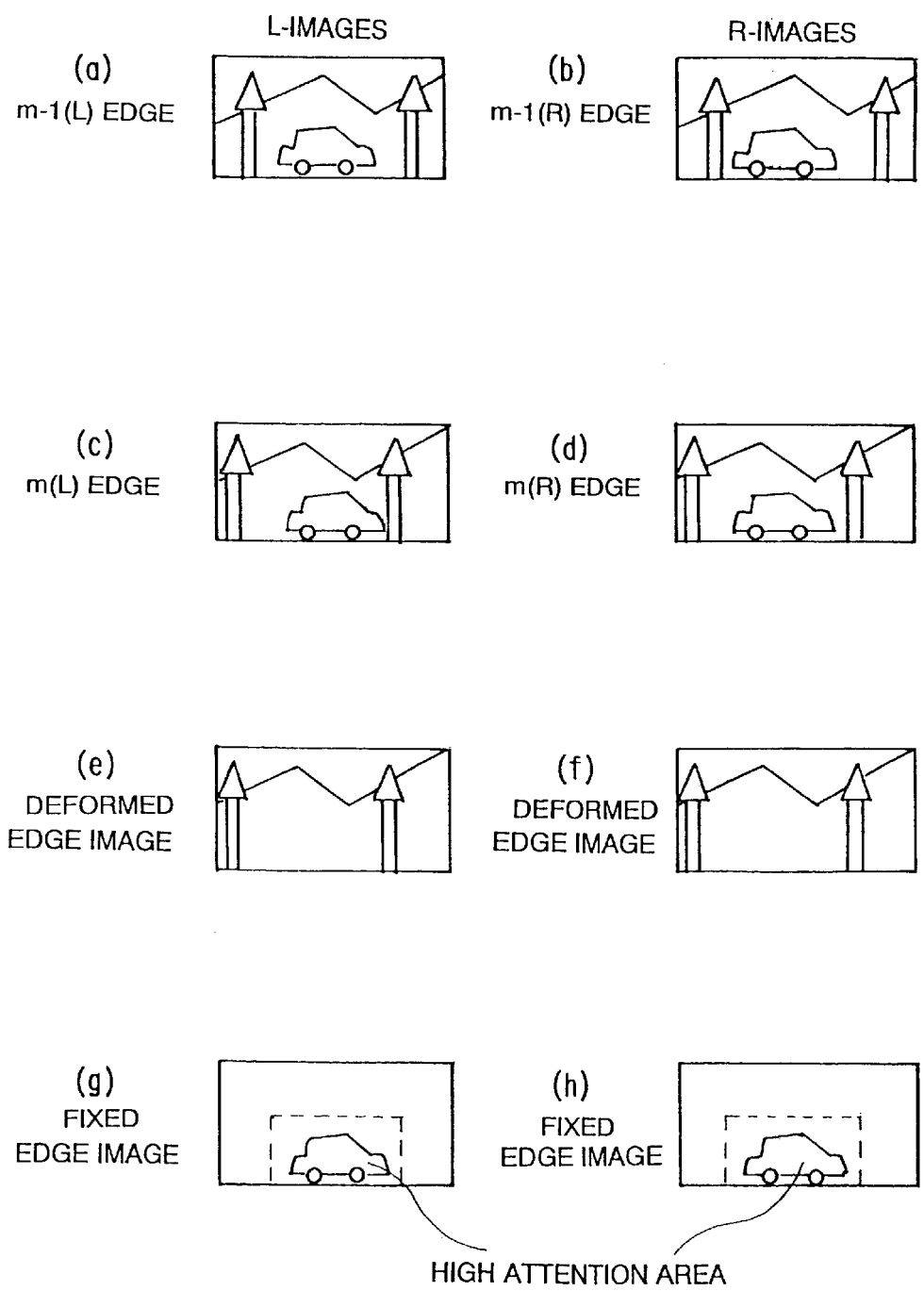
FIGS. 27(a)–(h), FIGS. 28(a)–(h), FIGS. 29(a)–(h) and FIGS. 30(a)–(h) are exemplary images that are processed in the seventh embodiment.

In the case of FIGS. 27(a) to 27(h), the left image frame m−1(L) as shown in FIG. 27(a) is subtracted from the edge image in the left image frame m(L) as shown in FIG. 27(c). FIG. 27(e) shows an image obtained as a result of the subtraction. As shown in FIG. 27(e), the car image remaining at the fixed position has vanished. Also, images with negative differences have vanished. Likewise, the right image frame m−1(R) as shown in FIG. 27(b) is subtracted from the edge image in the right image frame m(R) as shown in FIG. 27(d). FIG. 27(f) shows an image obtained as a result of the subtraction. In both the left and right image frames, edge images concerning the background images have been extracted. In this embodiment, the images generated in the step S43 are referred to as "deformed edge images".

(Step S44)

In this step S44, inter-frame non-deformed parts of edge images are detected. The detection is made such that a difference image is generated by subtracting each deformed edge image from the corresponding present edge image frame. FIGS. 27(g) and (h) show an image obtained by subtracting the image as shown in FIG. 27(e) from the image as sown in FIG. 27(c) and an image obtained by subtracting the image as shown in FIG. 27(f) from the image as shown FIG. 27(d). In either case, an edge image concerning the car has been extracted.

In this embodiment, the images generated in the step S44 are referred to as "fixed edge images".

(Step S45)

This step S45 corresponds to the high attention center presumable area determination in the step S3 in the first embodiment. In this embodiment, which ones of the deformed edge images obtained in the step S45 and the fixed edge images obtained in the step S44 contain observer's attention center image information, is estimated. The estimation is made such that an area having a part with edges concentrated therein is a high attention center presumable area.

In a specific method, the distribution of points of "1" in the image is detected. Then, a check is made as to which ones of the deformed and fixed edge images have a smaller scope distribution. This check is made on the basis of the concept that the smaller distribution scope edge images have higher likelihood of being peculiar areas in the display surfaces. Thus, the smaller distribution scope edge images are selected. When the distribution scope is substantially the same, those with closer mean coordinates to the image center coordinates are selected.

Figure 28:
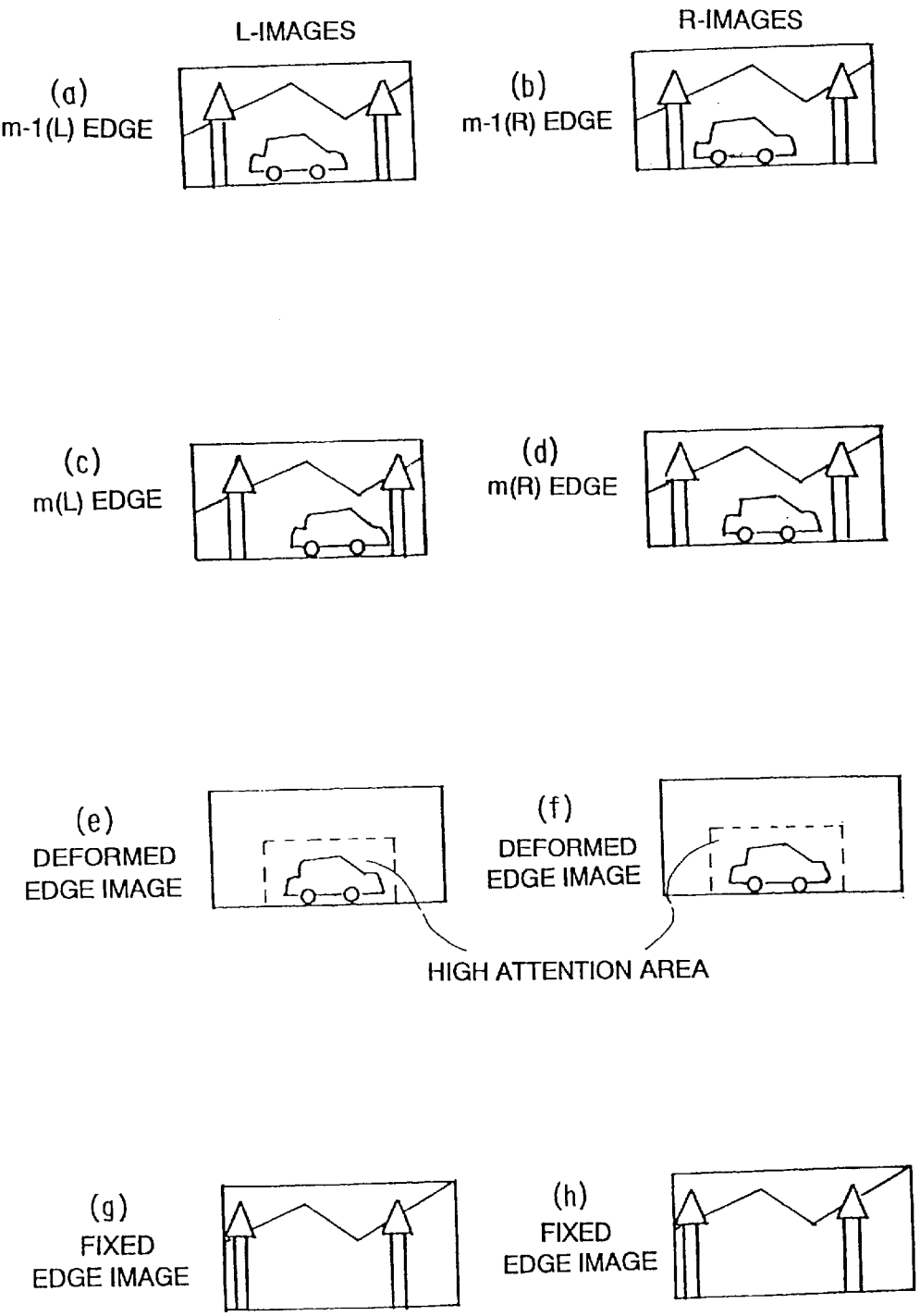

In the case of FIGS. 28(a) to 28(h), the images as shown in FIGS. 28(e) and 28(g) are compared. Since the fixed edge image as shown in FIG. 28(g) is smaller in the edge distribution scope, this image is selected. Likewise, images as shown in FIGS. 28(f) and 28(h) are compared. Since the fixed edge image as shown in FIG. 28(h) is smaller in the edge distribution scope, this image is selected. When the car image is moving on the display surface, the deformed edge image as shown in FIG. (e) or 28(f) is selected.

As shown, either deformed or fixed edge images are selected, and areas having centers corresponding to the mean coordinates of the selected edge images and also having a predetermined area are made to be high attention center presumable areas.

In the case of FIGS. 27(a) to 27(h) the dashed line rectangle areas shown in FIGS. 27(g) and 27(h) are selected to be high attention center presumable areas.

Of deformed and fixed edge images, when either ones have a smaller total number of data pieces (for instance "1" display surface sections among all the display surface sections) than a predetermined number, the other edge images are selected. The edge images of the smaller data piece number are not used as a basis of decision. This is made so in order to be able to cope with the case when the entire images change uniformly or the case of still images.

Figure 29:
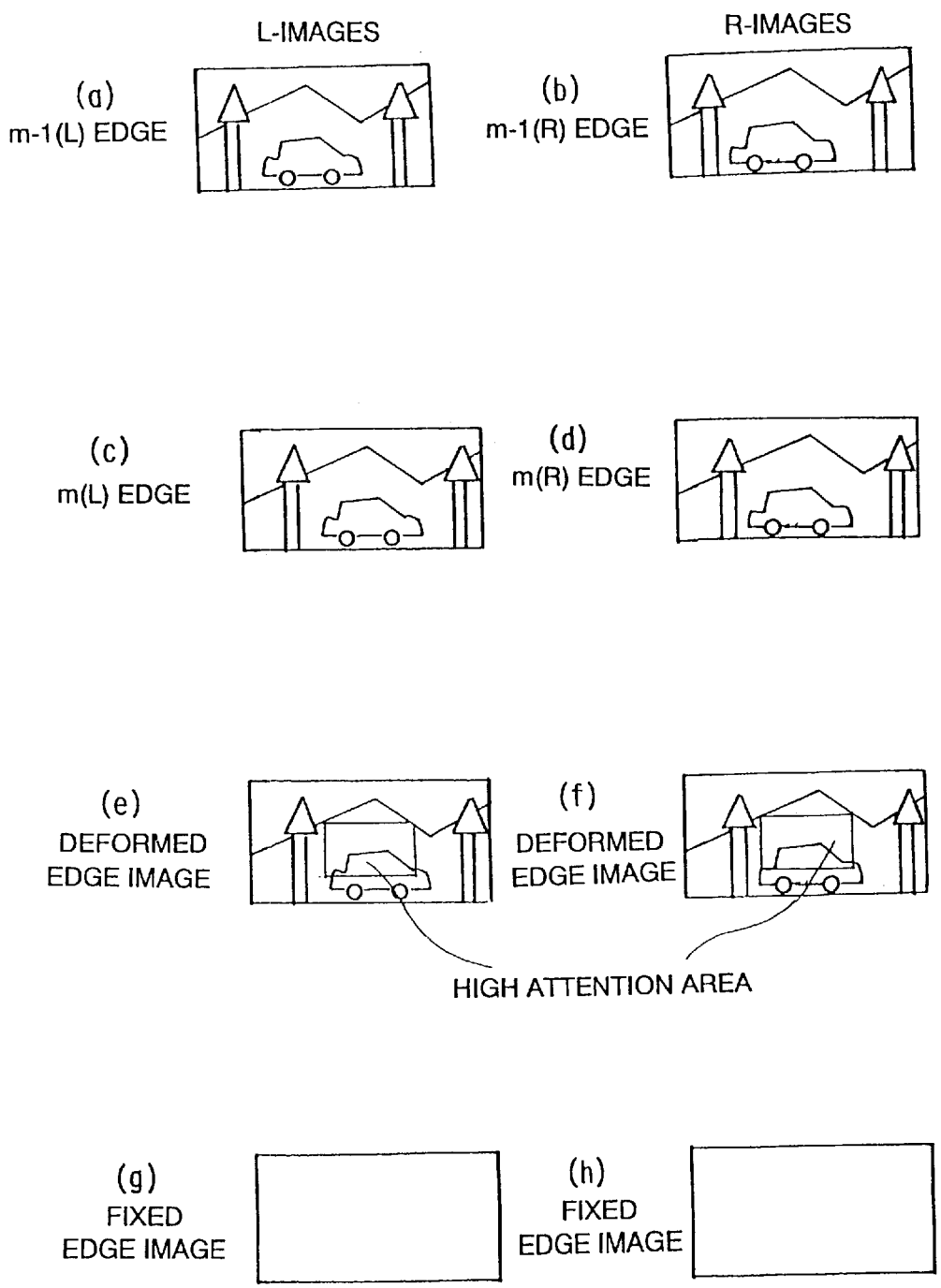

When images change uniformly, as shown in FIGS. 29(a) to 29(h), the deformed edge images as shown in FIGS. 29(e) and 29(f) are substantially the same as the present edge image frames as shown in FIGS. 29(g) and 29(h), while the fixed edge images as shown in FIGS. 29(g) and 29(h) have no edge. In this case, the total number of data pieces of the images as shown in FIGS. 29(g) and 29(h) is smaller, and the deformed edge images as shown in FIGS. 29(e) and 29(f) are selected.

Figure 30:
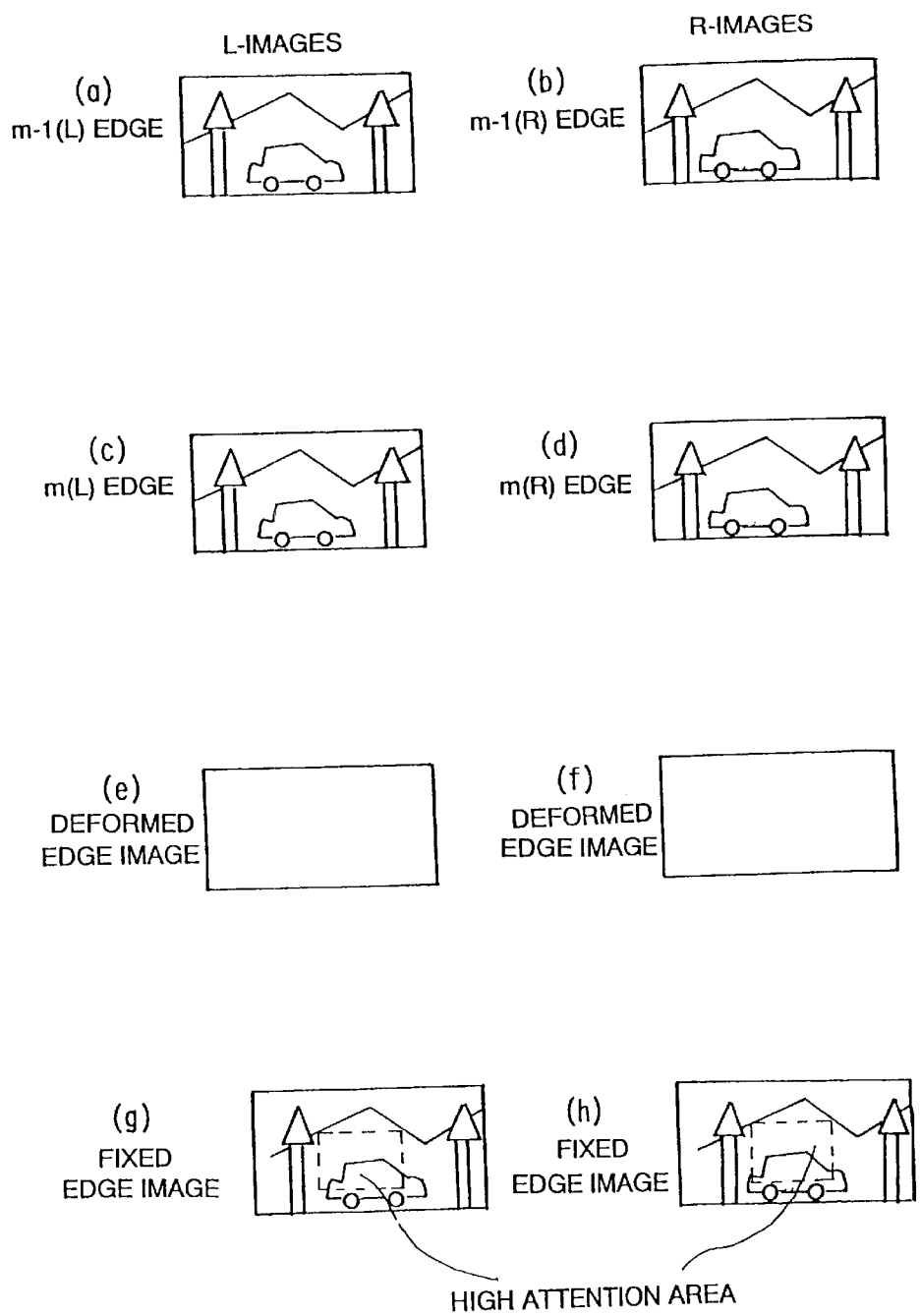

In the case of still images as shown in FIGS. 30(a) to 30(h), the situation is converse to that in the case of FIGS. 29(a) to 29(h). That is, the deformed edge images as shown in FIGS. 30(e) and 39(f) have no edge. In this case, the fixed edge images as shown in FIGS. 30(g) and 39(h) are selected.

With the above selection of either deformed or fixed edge images, predetermined central image areas of the selected edge images are made to be high attention center presumable areas. In the case of FIGS. 29(a) to 29(h), broken line rectangle areas shown in FIGS. 29(e) and 29(f) are high attention center presumable areas.

Figure 31:
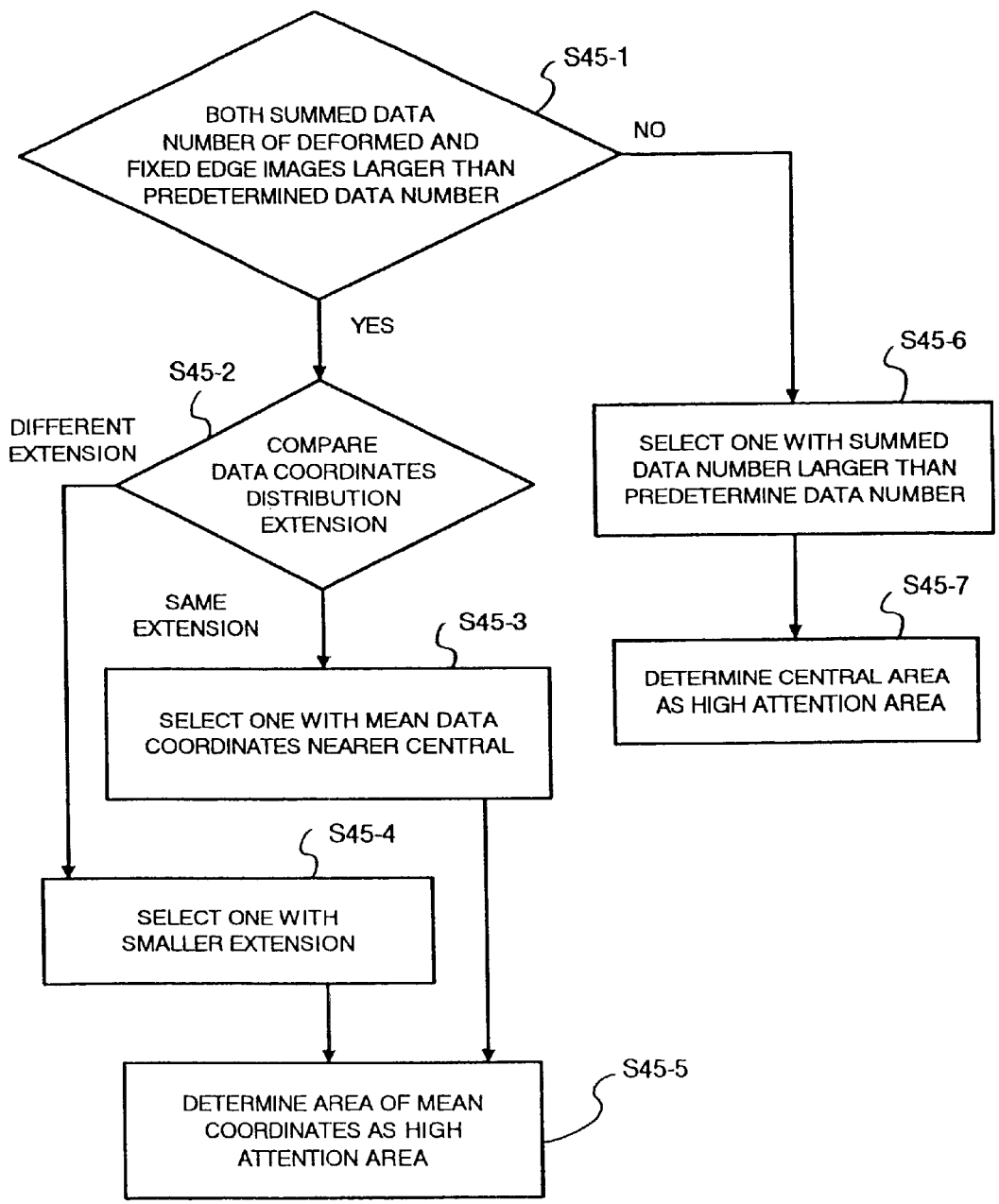
FIG. 31 is a routine of the high attention center presumable area determination in the seventh embodiment.

FIG. 31 is a flow chart Illustrating the above image selection operation executed in the step S45. It is possible to broadly cope with various images as shown above by permitting generation of deformed and fixed edge images and automatic decision of either ones of these edge images to be high attention center presumable areas.

FIG. 26 will now be referred to again.

(Step S46)

The depth distance of the images selected in the step S45 are determined. The depth distance is determined in the same manner as in the step S4 in the first embodiment.

(Step S47)

Coincidence control of the glance and vergence distances is made according to a depth distance signal. This control is made in the same manner as in the step S5 in the first embodiment.

(Step S48)

The left and right images are displayed. This operation is the same as in the step S6 in the first embodiment. The above steps S41 to S48 are repeatedly executed.

Figure 32:
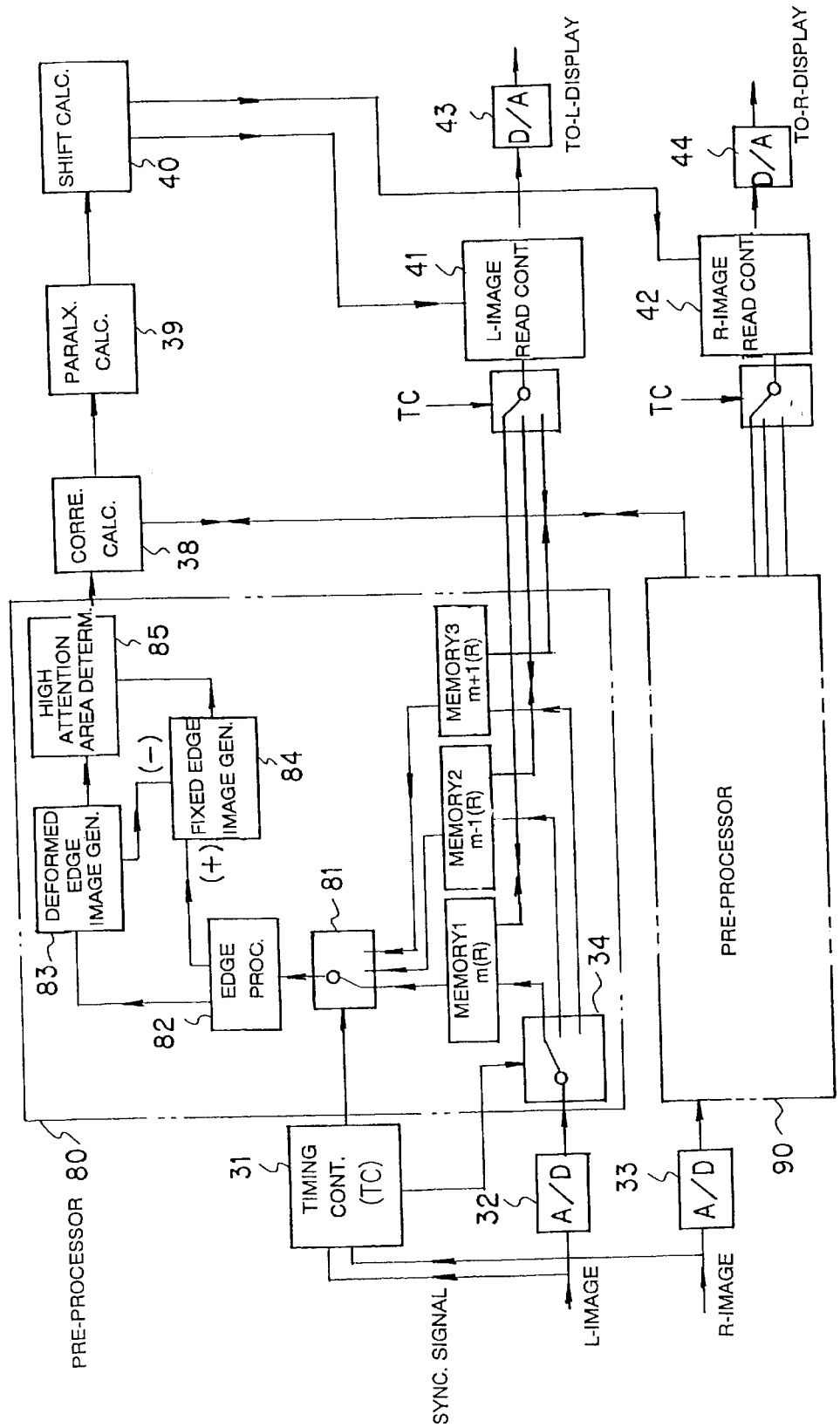
FIG. 32 is a block diagram showing the internal construction of the seventh embodiment of the stereo image display unit.

FIG. 32 is a block diagram showing the internal construction of the seventh embodiment of the stereo image display unit. In FIG. 32, preliminary processing sections for the left and right images, as shown enclosed in the broken line rectangles, have the same construction, and the illustration of the preliminary processing section for the right image is omitted.

Left and right image signals supplied from the stereo image generator 1 are A/D converted in A/D converters 32 and 33 and then supplied to preliminary processing sections 80 and 90. Sync signals separated from the left and right signals are supplied to a timing controller 31 for controlling timings of processing in each section.

The left image signal supplied to the preliminary processing section 80 is switched for each frame by a switch 34 for being stored in memories 1 to 3. Different image frames are thus stored in the memories 1 to 3. It is assumed that at instant m left image frames m(L) and m−1(L) are stored in the memories 1 and 2 and the next left image frame m+1(L) is to be stored in the memory 3. The same operation as for the left image is executed for the right image. This operation corresponds to the step S41.

Images read out from the memories 1 to 3 are successively supplied through a switch 81 to an edge processor 82 for edge image generation. As described before, the edge image generation is a binarizing process of making the edge parts to be "1" and the other parts to be "0". Edge images that are generated are supplied to a deformed and a fixed edge image generator 83 and 84. This operation corresponds to the step S42.

The deformed edge image generator 83 executes edge image subtraction by using successively received edge images. At the instant m the deformed edge image generator 83 has the edge image of frame m−1(R) previously stored, and subtracts this frame m−1(R) edge image from the frame m(R) edge image just received. An edge image signal produced as a result of the subtraction is supplied to the fixed edge image generator 84 and a high attention center presumable area determiner 85. This operation corresponds to the step S43.

The fixed edge image generator 84 successively subtracts the deformed edge images successively received from the deformed edge image generator 63 from the edge images successively received from the edge processor 82, thus generating the fixed edge images. The generated fixed edge images are supplied to the high attention center presumable area predictor 85. This operation corresponds to the step S44.

The high attention center presumable area determiner 85 determines high attention center presumable areas by using the deformed and fixed edge images. The high attention center presumable area determiner 85 executes high attention center presumable area calculation as shown by the flow chart of FIG. 31. As a result, edge images in the high attention center presumable areas are supplied to a correlation calculator 38. The same routine is executed for the left and right images. This operation corresponds to the step S45.

The correlation calculator 38 executes correlation calculation on the left and right edge images. This correlation calculation is the same as the correlation calculation in the first embodiment, and not described. As a result of this operation, a correlation value corresponding to correlation shift is supplied to the parallax calculator 39. The parallax calculator 39 obtains the final parallax in a manner as described before in connection with the first embodiment. The parallax is supplied to a shift calculator 40. This operation corresponds to the step S46.

Like the first embodiment, the shift calculator 40 calculates shifts for the left and right images, as given by the formulas (5) and (6), and supplies the calculated shifts to a left and a right display image read controller 41 and 42, respectively. The controllers 41 and 42 cause the image signals in the memories to be read out by causing the received shifts of the images. This operation corresponds to the step S47.

The left and right image signal thus read out with the shifts, are A/D converted in D/A converters 43 and 44 and then supplied to the left and right display devices in the HMD 3 for display thereon. This operation corresponds to the step S48.

As shown above, in the seventh embodiment edge image difference is detected, a peculiar change area in each image is obtained, the depth distance of the image in the area is obtained, and the glance vergence distances in stereo image observation are controlled to be coincident with each other. In this embodiment, no glance motion detector is used, so that it is possible to reduce the size of the unit and manufacture the unit at reduced cost. A further advantage is that the processing time can be reduced compared to the first embodiment, in which motion vectors are used, because difference calculation is adopted in the processing.

An eighth embodiment, which obtains the parallaxes of both fixed and deformed edge images, will be described.

This embodiment is a modification of the seventh embodiment. In the seventh embodiment, either deformed or fixed edge images that have a greater total number of data pieces are selected. In this embodiment, the parallax concerning the deformed edge images and that concerning the fixed edge images are compared for selecting the final parallax.

Figure 33:
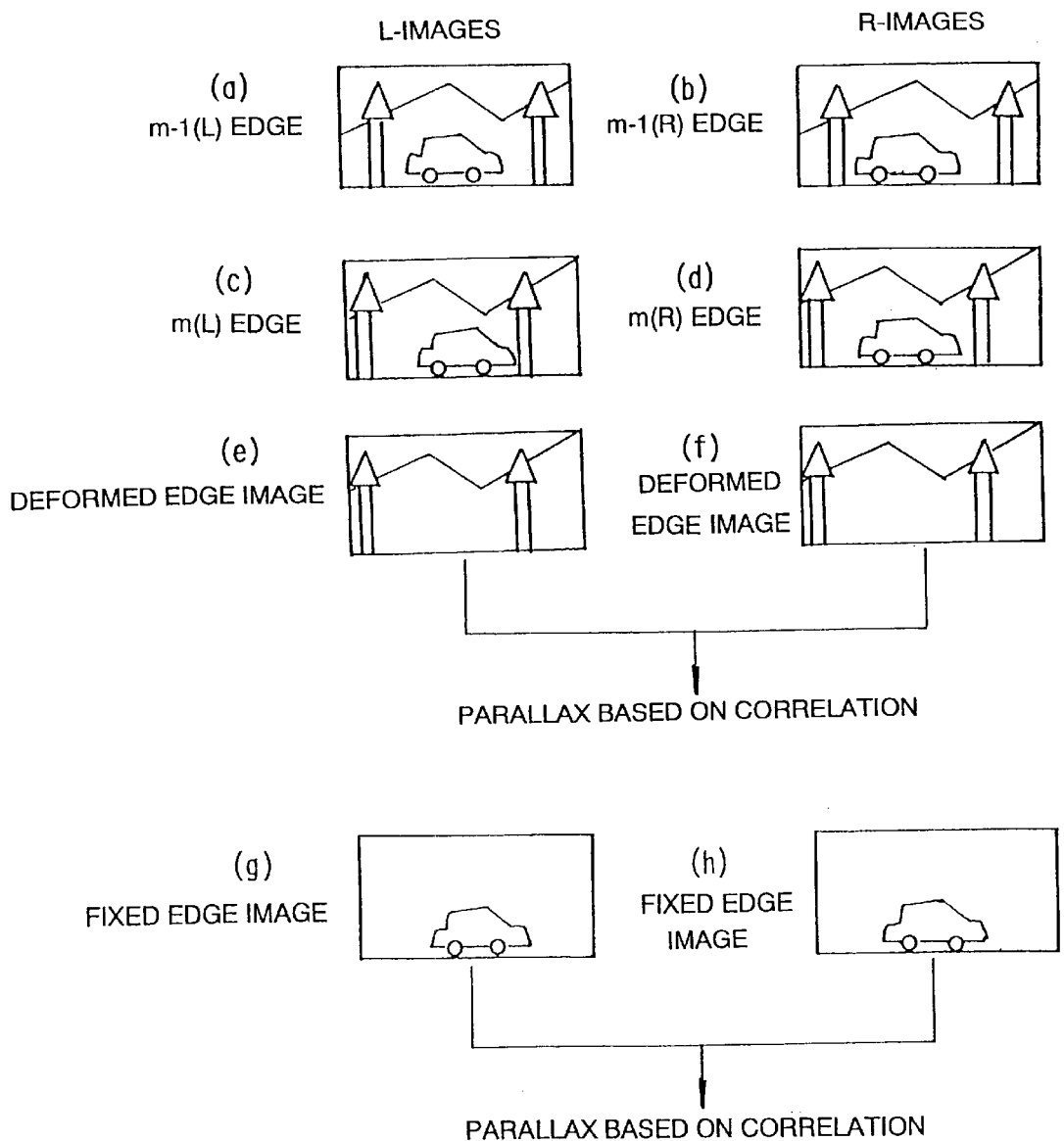
FIG. 33 are exemplary images that are processed in the eighth embodiment.

Reference is now had to FIGS. 33(*a*) to 33(*h*). This embodiment is the same as the seventh embodiment until deformed edge images as shown in FIGS. 33(*e*) and 33(*f*) and fixed edge images as shown in FIGS. 33(*g*) and 33(*h*) are obtained. In this embodiment, the parallax concerning the left and right deformed edge images is obtained by correlation calculation, and the parallax concerning the left and right fixed edge images is also obtained by correlation calculation. The final parallax is determined by using the two parallaxes thus obtained. Like the seventh embodiment, the determination is made as follows.

(1) The greater parallax is made to be the final parallax. That is, the closer parallax is selected. In the case of FIGS. 33(*g*) to 33(*h*), the parallax concerning the fixed edge images is selected to be the final parallax.

(2) The mean value of the parallaxes concerning the deformed and fixed edge images is selected to be the final parallax.

(3) The parallax corresponding to the greatest correlation peak in obtaining parallaxes is selected to be the final parallax. Where data pieces are dispersed over the entire display surface as in background image, the correlation peak of left and right images is low. On the other hand, with high contrast image areas or great data piece areas, the correlation peak is high. The latter areas are thus estimated to be observer's high attention center presumable areas, and the parallax concerning the higher correlation peak images are selected to be the final parallax.

Figure 34:
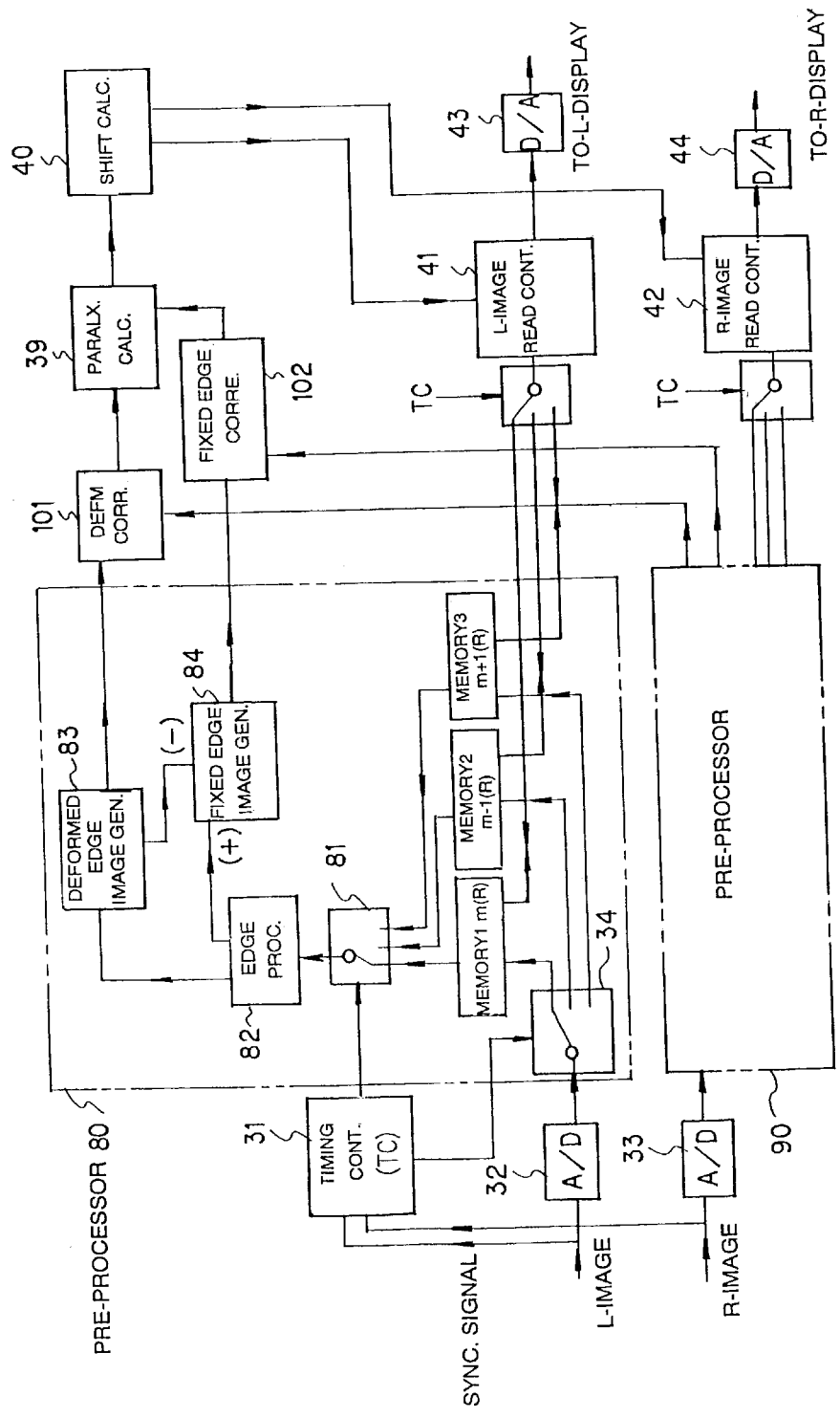
FIG. 34 is a block diagram showing the internal construction of the eighth embodiment of the stereo image display unit.

FIG. 34 is a block diagram showing the internal construction of the eighth embodiment of the stereo image display unit. For both the left and right images the circuit of this embodiment is the same as in the block diagram showing the seventh embodiment up to the point at which deformed and fixed edge images have been obtained. In this embodiment, a deformed edge image correlation calculator 101 for executing correlation calculation by receiving the left and right deformed edge images and a fixed edge image correlation calculator 102 for executing correlation calculation by receiving the left and right fixed edge images, are provided in lieu of the high attention center presumable area determiner 65 and the correlation calculator 38 in the seventh embodiment.

In this embodiment the two correlation calculation operations are executed concurrently in lieu of the operations of high attention center presumable area determination and subsequent correlation calculation, and it is thus possible to reduce the processing time.

A ninth embodiment, which classifies image changes by using bold line edge images, will be described.

This embodiment is a modification of the seventh embodiment. In this embodiment, unlike the seventh embodiment, images are classified into three groups, i.e., one with no inter-image changes, one with little inter-image changes and one with much inter-image changes. Observer's high attention center presumable area images are selected from among the three different groups of images. For carrying out this method, bold edge line images are additionally generated as new edge images.

Figure 35:
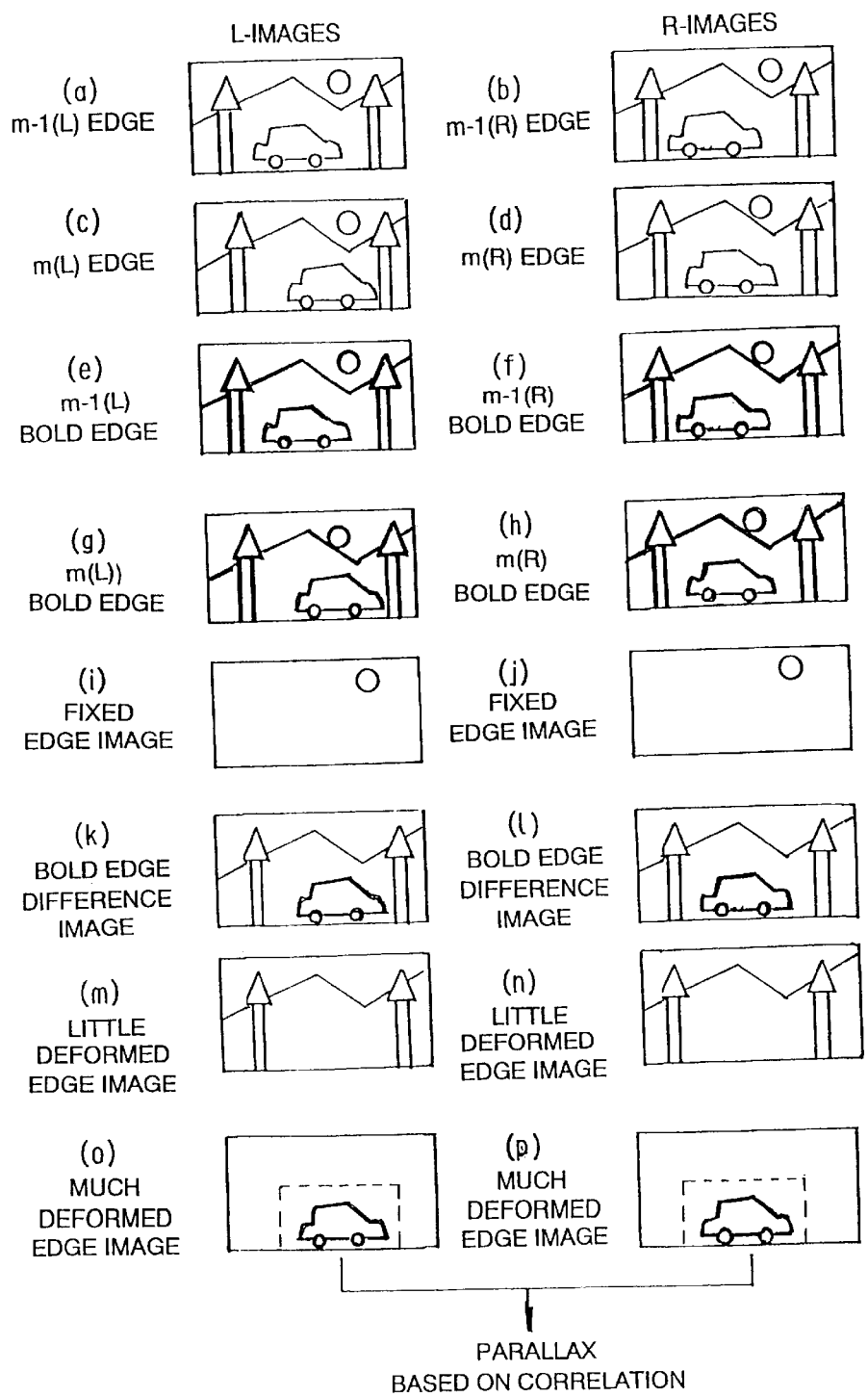
FIG. 35 are exemplary images that are processed in the ninth embodiment.

FIGS. 35(*a*) to 35(*p*) show an example of images. FIGS. 35(*a*) to 35(*d*) show edge images of received image frames m−1(L), m−1(R), m(L) and m(R). Here, the circle images are images with no inter-image change, the car images are images with much inter-image changes, and the background images are images with small inter-image changes. FIGS. 35(*e*) to 35(*h*) are obtained by subjecting the images as shown in FIGS. 35(*a*) to 35(*d*) to a well-known bold line process.

Then, edge images without inter-image change are generated by using the ordinary edge images. These edge images are generated by multiplication of ordinary edge image. For instance, multiplication of the images as shown in FIGS. 35(*a*) and 35(*c*) is made. As a result, an image as shown in FIG. 35(*i*) is obtained. Specifically, multiplication of image parts without inter-image change produces value "1", while multiplication of image parts with inter-image changes produces value "0". Consequently, edge image parts without inter-image change are extracted. That is, only edge image of the circles are left. Likewise, multiplication of the images as shown in FIGS. 35(*b*) and 35(*d*) is made to obtain an image as shown in FIG. 35(*j*). The images thus obtained are referred to as fixed edge images.

Then, difference images are generated by subtracting preceding frame bold line edge images from present frame bold line edge images. Here negative data values obtained as a result of subtraction is made to be "0". For example, the bold line edge image of frame m−1(L) as shown in FIG. 35(*e*) is subtracted from the bold line edge image of frame m(L) as shown in FIG. 35(*g*). As a result, an image as shown in FIG. 35(*k*) is obtained. Specifically, as a result of the subtraction edge images without inter-image change are canceled, and the greater the inter-image changes edge images of the bolder edge lines are obtained. This is so because the faster the motion the deviation between the edges of the two images. With the right image frames, an image as shown in FIG. 35(*l*) is obtained by the same process.

Then, the difference images obtained from the bold line edge images are classified with reference to a predetermined line edge width into two groups.

Motion detection based on bold line edge images permits obtaining information containing the extent motion concerning fine motions within the predetermined edge line width. As a result of the subtraction, the original edge line width is reduced in correspondence to an overlap part. The extent of fine motion can be known from the remaining or difference edge line width. In the case of motion detection based on only fine edge lines as in the seventh embodiment, no overlap of edge portions (i.e., fine edge lines) resulting from fine motion is taken into considerations, and therefore, no overlap of bold line edges, and hence no information concerning the extent of motion, is obtainable.

From the image as shown in FIG. 35(k), only thin edge line image parts are extracted to obtain an image as shown in FIG. 35(k). Also, only thick edge line image parts are extracted to obtain an image as shown in FIG. 35(o). The thin edge line images involve little image changes, and herein referred to as little deformed edge images. The thick edge line images, on the other hand, involve much image changes, and herein referred to as much deformed edge images.

For the right image frames, images as shown in FIGS. 35(n) and 35(p) are obtained by the same process.

Subsequently, using the fixed, little deformed and much deformed edge images thus obtained, high attention center presumable areas are obtained by executing the same process as in the step S45 in the seventh embodiment. In the case of FIGS. 35(a) to 35(p) the much deformed edge images are selected. The subsequent processing is the same as in the seventh embodiment.

Figure 36:
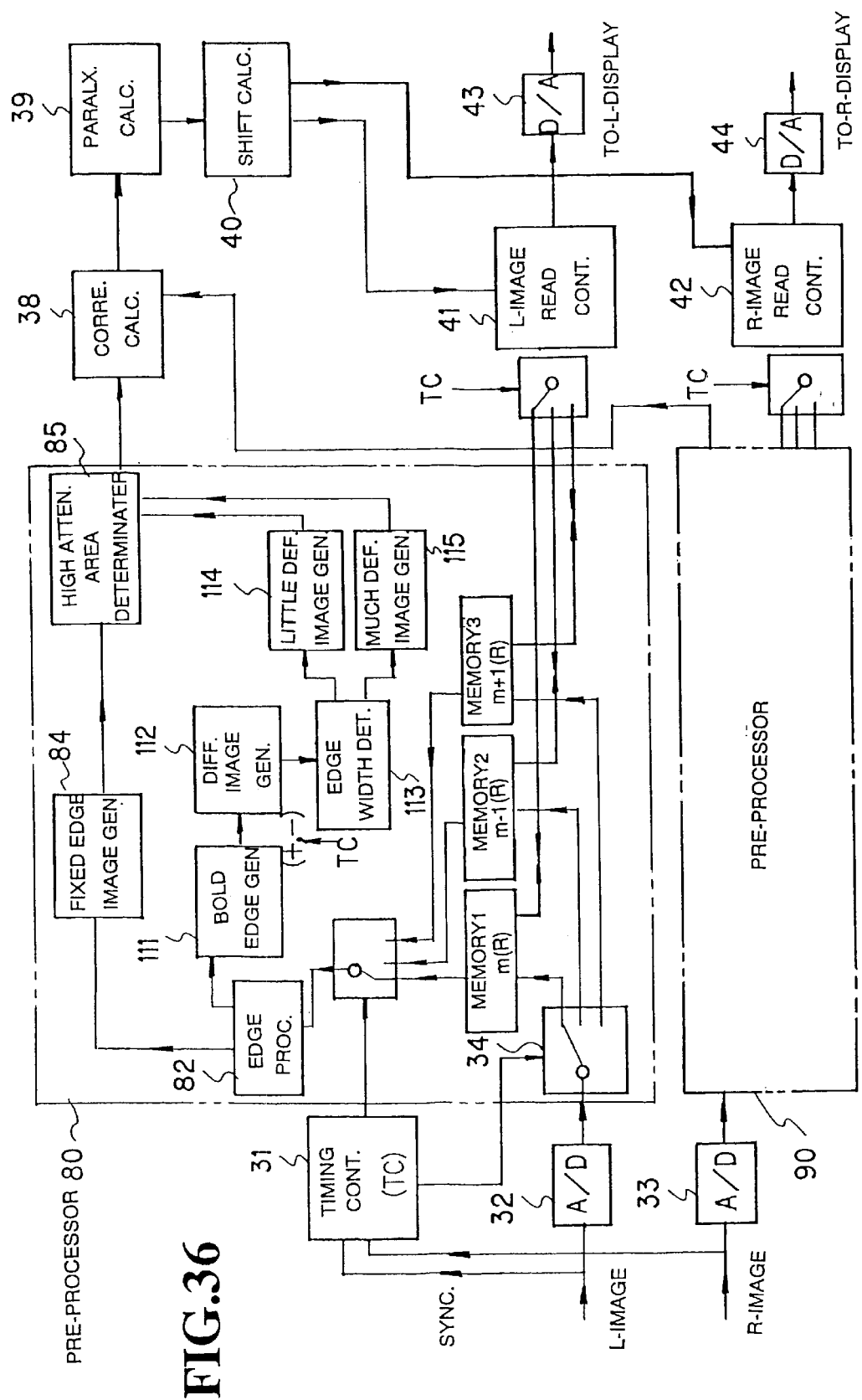
FIG. 36 is a block diagram showing the internal construction of the ninth embodiment of the stereo image display unit.

FIG. 36 is a block diagram showing the internal construction of the ninth embodiment of the stereo image display unit. The illustrated circuit is different from the circuit of the seventh embodiment as shown in the block diagram of FIG. 32 in that a bold edge line generator 111, a difference image generator 112, an edge line width detector 113, little deformed edge image generator 114 and a much deformed edge image generator 115 in lieu of the deformed edge image generator 83. While in the ninth embodiment images are classified into three groups, i.e., a fixed, a little deformed and much deformed edge image group, it is possible to more finely classify images, to four, five or more groups by providing an increased number of reference edge line widths. For example, this may be realized by providing a little, a medium and a much deformed edge image generator in lieu of the little and much deformed edge image generators 114 and 115 as shown in FIG. 36. In this way, finer classification of image changes is obtainable by increasing the number of different edge image groups.

With the ninth embodiment, since images are classified in dependence on the image change extent, it is possible to obtain more accurate high attention center presumable area determination.

Now, a tenth embodiment using line memory will be described.

This embodiment is again a modification of the seventh embodiment. In this embodiment, the image data supplied to a left and a right output stage D/A converter are given a shift corresponding to a desired parallax by controlling the timing of reading out data from a line memory, which is inserted in each of the left and right image data transmission lines, according to the result of shift calculation as in the seventh embodiment.

Figure 37:
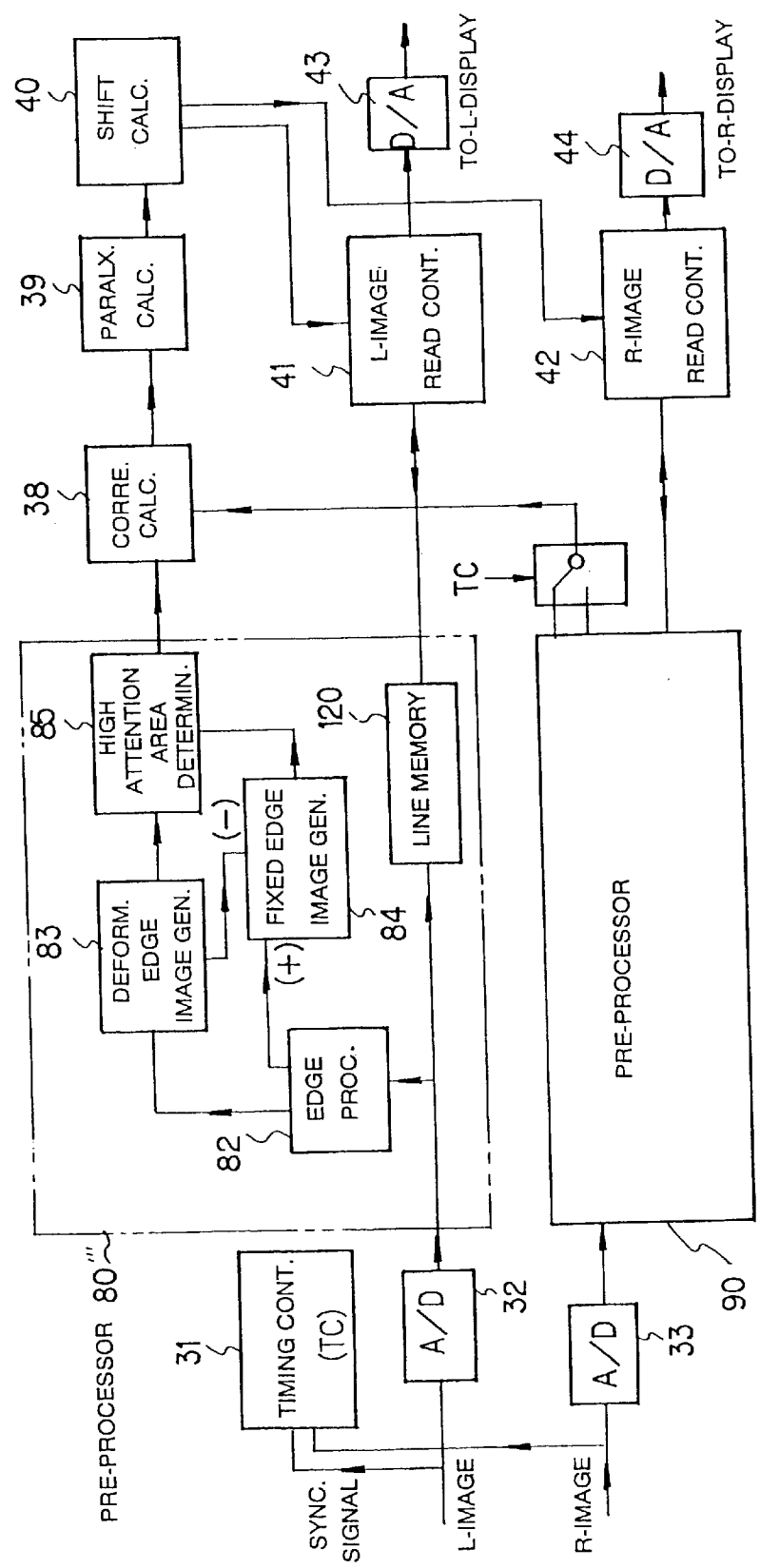
FIG. 37 is a block diagram showing the internal construction of the tenth embodiment of the stereo image display unit.

FIG. 37 is a block diagram showing the internal construction of the tenth embodiment of the stereo image display unit. In this embodiments, image signals themselves need not be stored, and thus no memories like the memories 1 to 3 in the seventh embodiment are necessary. Instead, a line memory 120 is required for shifting images. Image signals are supplied to an edge processor 82 and also to the line memory 120. A shift signal is generated in the same process as in the seventh embodiment, and supplied to the left and right display image read controllers 41 and 42. That is stored in the line memory 120 are not image frames m but those several frames afterwards.

This embodiment is effective for stereo images without substantial parallax change. Since the sole line memory 120 is used to store image signals, the unit can be manufactured at a reduced cost.

While in the above embodiments the left and right image signals from the stereo image processor 2 are supplied directly to the HMD 3, it is also possible that the left and right image signals are once recorded on a recording medium and then read out to be supplied to the HMD 3 for display.

The exemplified constitutions of and the advantages obtainable with the basic embodiments of the invention will now be mentioned.

Unit 1:

A stereo image display unit comprising:

input means for receiving signals representing stereo image;

image change detection means for detecting changes with time in stereo image represented by the signals received from the input means;

high attention center presumable area determination means for determining a peculiar local area of a displayed image area to be an observer's high attention center presumable area according to a result of detection by the image change detection means;

depth detection means for obtaining information representing the depth of the image in the particular local area specified by the high attention center presumable area determination means;

depth control means for controlling a quantity concerning the depth of stereo image represented by the signals received form the input means according to the depth information received form the depth detection means; and output means capable of outputting signals representing stereo image, with the quantity concerning the depth having been controlled by the depth control means, as stereo image signals to be displayed on stereo image display means.

In the above unit 1, stereo image changes with time are detected, observer's high attention center presumable areas are determined according to the detected changes, and the stereo image is depth controlled according to depth information of images in the above areas. It is thus possible to obtain stereo image easily observable by the observer without use of any high detection accuracy glance motion detector.

Unit 2:

The stereo image display unit according to the unit 1, wherein the high attention center presumable area determination means specifies, in the case of detection of a peculiar local area according to the result of detection by the image change detection means, the peculiar local area to be an observer's high attention center presumable area and, in the case detection of no peculiar area, a predetermined area to be an observer's high attention center presumable area.

In the above unit 2, a peculiar local area in image is detected and determined to be an observer's high attention center presumable area, so that the constitution can adequately cope with various scenes (such as images with local moving parts, images with local still parts, images changing uniformly and still images).

Unit 3:

The stereo image display unit according to the unit 2, wherein image change detection means includes sub-area image change detection means for detecting changes with time in images for each of a plurality of sub-areas constituting the entirety of a pertinent image, and the high attention center presumable area determination means specifies a sub-area with a peculiar change with time in image as detected by the image change detection means among the plurality of sub-areas to be an observer's high attention center presumable area.

In the above unit 3, a peculiar local area in image is detected and determined to be an observer's high attention center presumable area, so that the constitution can cope with various scenes (such as images with local moving parts and images with local still parts).

Unit 4:

The stereo image display unit according to the unit 1, wherein the image change means includes sub-area motion vector detection means for detecting a motion vector representing a change with time in image for each of a plurality of sub-areas constituting the entirety of a pertinent image, and the high attention center area determination means specifies a sub-area, the motion vector of which as detected by the image change detection means among the plurality of sub-areas is substantially equal to a glance motion vector representing the observer's glance motion, as detected by glance motion detection means, to be an observer's high attention center presumable area.

In the above unit 4, a high attention center presumable area is determined by means for detecting observer's glance changes and means for detecting image changes. It is thus possible to sufficiently cope with different observers in the high attention center area determination.

Unit 5:

The stereo image display unit according to the unit 1, wherein the image change detection means includes image area discrimination means for discriminating a change image area with a recognized change with time in image and a no-change image area with no recognized change with time in image in the entirety of a pertinent image, and the high attention center presumable area determination means compares the change and no-change image areas and specifies either one thereof to be an observer's high attention center presumable area.

In the above unit 5, areas is divided on the basis of the image change, the divided local area is determined to be an observer's high attention center presumable area, so that the constitution can cope with various scenes (such as images with local moving parts and images with local still parts).

As is seen from the foregoing, according to the present invention, observer's high attention center presumable point (or image area) is determined on the basis of the result of changes with time in stereo image, and stereo image is depth controlled according to depth information of image at the high attention center presumable point. Thus, it is possible to provide a stereo image display unit, which does not require any particular high detection accuracy glance motion detector so that it is light in weight and can be manufactured at low cost while being able to provide stable stereo image capable of being very easily observed.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A stereo image display unit comprising:

input means for receiving signals representing a stereo image;

image change detection means for detecting changes in time in the stereo image represented by the signals received from the input means;

high attention center presumable area determination means for determining an area of a displayed image area to be an observer's high attention center presumable area according to a result of detection by the image change detection means;

depth detection means for obtaining information representing the depth of the image in the area determined by the high attention center presumable area determination means;

depth control means for controlling a quantity relating to the depth of the image according to the depth information received form the depth detection means; and output means capable of outputting signals representing stereo images that incorporate depth information, the depth information being controlled by the depth control means, as stereo image signals to be displayed on stereo image display means;

wherein:

the image change detection means includes sub-area motion vector detection means for detecting a motion vector representing a change in time for each of a plurality of sub-areas constituting the entirety of the image; and the high attention center presumable area determination means recognizes a fluctuation range of the motion vectors of the plurality of small areas, and when the fluctuation range is in excess of a predetermined scope, labels each area group consisting of at least one area with a motion vector exceeding a predetermined portion of the fluctuation range and determines a predetermined one of the labeled area groups to be a high attention center presumable area; and when the fluctuation range is not in excess of the predetermined scope, determines a sub-area deviated from the center of the image or a predetermined area therein by a distance corresponding to the mean motion vector in the opposite direction thereto to be a high attention center presumable area.

2. A stereo image display unit comprising:

input means for receiving signals representing stereo images;

image change detection means for detecting changes in time in the stereo images represented by the signals received from the input means;

glance motion detection means for roughly detecting the direction of an observer's glance motion;

high attention center presumable determination means for determining an area in the images as a high attention center presumable area of the observer according to the result of detection by the image change detection means and the result of detection by the glance motion detection means, and means for executing a control operation for obtaining coincidence of the glance distance and vergence distance relating to the high attention center presumable area determined by the high attention center presumable area determination means.

3. A stereo image display unit comprising:

input means for sequentially receiving left and right image signals representing stereo images;

edge image generation means for generating edge images by extracting edge components of images represented by left and right image frame signals sequentially received from the input means;

high attention center presumable area determination means for generating a first kind of image by taking the difference of the preceding frame from the present frame edge image generated by the edge image generation means, generating a second kind of image by subtracting the first kind of image from the present frame edge image and determining a particular area in the image, including either the first or the second kind of image that has a higher concentration of edges, to be an high attention center presumable area of an observer;

depth detection means for obtaining depth information of the image displayed in the area determined by the high attention center presumable area determination means;

depth control means for controlling a quantity relating to the depth of the stereo image represented by the signals received from the input means according to the depth information of the images; and output means for supplying signals representing the stereo images, having been depth controlled by the depth control means, as stereo image signals for display to stereo image display means; wherein at least either the high attention center presumable area determination means, the depth detection means, the depth control means or the output means uses a delay element to delay processing by the high attention center presumable area determination means, the depth detection means, the depth control means, or the output means, respectively.

* * * * *